US006857102B1

(12) United States Patent
Bickmore et al.

(10) Patent No.: US 6,857,102 B1
(45) Date of Patent: Feb. 15, 2005

(54) DOCUMENT RE-AUTHORING SYSTEMS AND METHODS FOR PROVIDING DEVICE-INDEPENDENT ACCESS TO THE WORLD WIDE WEB

(75) Inventors: Timothy W. Bickmore, Somerville, MA (US); William N. Schilit, Menlo Park, CA (US); Andreas Girgensohn, Menlo Park, CA (US); Joseph W. Sullivan, San Francisco, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 438 days.

(21) Appl. No.: 09/239,295

(22) Filed: Jan. 29, 1999

Related U.S. Application Data

(60) Provisional application No. 60/080,909, filed on Apr. 7, 1998.

(51) Int. Cl.[7] .............................................. G06F 15/00

(52) U.S. Cl. .................... 715/501.1; 715/523; 715/530; 715/500; 715/513

(58) Field of Search ................................ 707/501, 500, 707/513, 511, 516, 530, 501.1; 715/501.1, 513, 530, 523

(56) References Cited

U.S. PATENT DOCUMENTS

| | | | | |
|---|---|---|---|---|
| 5,341,469 A | * | 8/1994 | Rossberg et al. | 707/514 |
| 5,764,235 A | * | 6/1998 | Hunt et al. | 345/428 |
| 5,845,303 A | * | 12/1998 | Templeman | 707/517 |
| 5,848,415 A | * | 12/1998 | Guck | 707/10 |
| 5,878,421 A | * | 3/1999 | Ferrel et al. | 707/100 |
| 5,887,133 A | * | 3/1999 | Brown et al. | 709/200 |
| 5,895,471 A | * | 4/1999 | King et al. | 707/1 |
| 5,999,912 A | * | 12/1999 | Wodarz et al. | 705/14 |
| 6,023,714 A | * | 2/2000 | Hill et al. | 345/760 |
| 6,128,655 A | * | 10/2000 | Fields et al. | 709/219 |
| 6,134,565 A | * | 10/2000 | Hommersom et al. | 707/517 |
| 6,184,997 B1 | * | 2/2001 | Hanyu et al. | 358/1.15 |
| 6,226,642 B1 | * | 5/2001 | Beranek et al. | 707/10 |
| 6,366,933 B1 | * | 4/2002 | Ball et al. | 707/511 |

OTHER PUBLICATIONS

Spyglass, "Concepts and Application" copyright 1997, pp. 1–8.*
Spyglass Prim 1.0, copyright 1997, pp. 1–2.*
I. Cooper et al., "PDA Web Browsers: Implementation Issues", University of Kent at Canterbury Computing Laboratory WWW Page, Nov. 1995.
H. Lie et al., "Cascading Style Sheets", WWW Consortium, Sep. 1996.
J. Hsu et al., "Active Outlining for HTML Documents: An X–Mosaic Implementation", Second International World Wide Web Conference, Chicago, IL, Oct. 1994.

(List continued on next page.)

Primary Examiner—Stephen S. Hong
Assistant Examiner—Thu Huynh
(74) Attorney, Agent, or Firm—Oliff & Berridge, PLC

(57) ABSTRACT

An automatic re-authoring system and method re-author a document originally designed for display on a desktop computer screen for display on a smaller display screen, such as those used with a PDA or a cellular telephone. The automatic re-authoring system and method input a document to be re-authored and re-authoring parameters, such as display screen size, default font and the like. The automatic re-authoring system and method convert the document into a number of pages, where each page is fully displayable with only at most a minimal amount of scrolling on the display screen of the PDA or cellular phone. At each stage of the re-authoring, a number of different transformations are applied to the original document or a selected re-authored page. The selected re-authored page is the best page resulting from the previous re-authoring stage. The best page at each stage is determined based on the re-authoring parameters and the content of the document being re-authored.

63 Claims, 14 Drawing Sheets

OTHER PUBLICATIONS

C. Brooks et al., Application–Specific Proxy Servers as HTTP Stream Transducers, Fourth International World Wide Web Conference, Boston, MA, Dec. 1995.

Tim Bray, "Measuring the Web," Computer Networks and ISDN Systems 28 (1996), pp. 993–1005.

Stéphane Bonhomme et al., "Interactively Restructuring HTML Documents," Computer Networks and ISDN Systems 28 (1996), pp. 1075–1084.

J. Barlett, "Experience with a Wireless World Wide Web Client", IEEE COMPCOM 95, San Francisco, CA, Mar. 1995.

S. Gessler et al., "PDAs as Mobile WWW Browsers", Second International World Wide Web Conference, Chicago, IL, Oct., 1994.

Eric A. Bier et al., "Toolglass and Magic Lenses: The See–Through Interface," Proceedings of Siggraph '93 (Anaheim, Aug.), Computer Graphics Annual Conference Series, ACM 1993, pp. 73–80.

Armando Fox et al., "Reducing WWW Latency and Bandwidth Requirements By Real–Time Distillation," Computer Networks and ISDN Systems 28 (1996), pp. 1445–1456.

Armando Fox et al., "Adapting to Network and Client Variation Using Infrastructural Proxies: Lessons and Perspectives."

Allison Woodruff et al., "An Investigation of Documents from the World Wide Web," Computer Networks and ISDN Systems 28 (1996), pp. 963–980.

Geoffrey M. Voelker et al., "Mobisaic: An Information System for a Mobile Wireless Computing Environment," *IEEE,* 1995, pp. 185–190.

Terri Watson, "Application Design for Wireless Computing," *IEEE,* 1995, pp. 91–94.

Benjamin B. Bederson et al., "Pad++: A Zooming Graphical Interface for Exploring Alternate Interface Physics," Proceedings of UIST '94, Nov. 2–4, 1994, pp. 17–26.

Tomonari Kamba et al., "Using Small Screen Space More Efficiently," CHI 96, Vancouver, BC, Canada, Apr. 13–18, 1996, pp. 383–390.

"Digestor: device–independent access to the World Wide Web", Timothy W. Bickmore et al., *Computer Networks and ISDN Systems,* vol. 29, No. 8–13, Sep. 1997, pp. 1075–1082.

"Converting PC GUIs for NonPC Devices", Dan Johnson, *Circuit Cellar Ink,* No. 91, pp. 40–42, 44–45, Feb. 1998.

\* cited by examiner

DOCUMENT RE-AUTHORING SYSTEMS AND METHODS FOR PROVIDING DEVICE-INDEPENDENT ACCESS TO THE WORLD WIDE WEB

This application claims the benefit of provisional 60/080,909 filed on Apr. 7, 1998.

BACKGROUND OF THE INVENTION

1. Field of the Invention

This invention is directed to document re-authoring systems and methods that automatically re-author arbitrary documents from the world-wide web to display the documents appropriately on small screen devices, such as personal digital assistants (PDAs) and cellular phones, providing device-independent access to the web.

2. Description of Related Art

Access to world-wide web documents from personal electronic devices has been demonstrated in research projects such as those described in J. Bartlett, "Experience with a Wireless World Wide Web Client", IEEE COMPCON 95, San Francisco, Calif., March 1995; S. Gessler et al., "PDAs as Mobile WWW Browsers", Second International World Wide Web Conference. Chicago, Ill., October 1994; G. Voelker et al., "Mobisaic: An Information System for a Mobile Wireless Computing Environment", Workshop on Mobile Computing Systems and Applications. Santa Cruz, Calif., December 1994; and T. Watson, "Application Design for Wireless Computing", 1994 Mobile Computing Systems and Applications Workshop Position Paper, August 1994. Such access is now a commercial reality. General Magic's Presto! Links for Sony's MagicLink, and AllPen's NetHopper for the Newton and Sharp's MI-10 all provide WWW browsers for PDA class devices, while the Nokia 9000 Communicator and Samsung's Duett provide web access capabilities from cellular phones.

Unfortunately, most documents on the world-wide web and other distributed networks are designed for display on desktop computers with color monitors having at least 640×480 resolution. Many pages are designed with even larger resolution monitors in mind. In contrast, most PDA class devices and cellular phone displays are much smaller. This difference in display area can lead to a ratio of designed vs. available display area from 4-to-1 to 100-to-1, or greater, making direct presentation of most worldwide web documents on these small devices aesthetically unpleasant, un-navigable, and in the worst case, completely undecipherable. This presents a central problem in accessing worldwide web pages using these small devices: how to display arbitrary web documents, such as HTML documents, that have been designed for desktop systems on personal electronic devices that have much more limited display capabilities.

Technologies already provide computational mobility and wireless connectivity, but the standard solutions to viewing documents and web pages on tiny screens are to either increase the screen resolution, which is great if the user happens to carry a magnifying glass, or to provide the ability to FAX or print to a local hardcopy device, which is both inconvenient and contradicts the rationale for having electronic documents in the first place. There are five general approaches to displaying web documents on small screen devices: device-specific authoring; multiple-device authoring; client-side navigation; automatic re-authoring; and web page filtering. Device-specific authoring involves authoring a set of web documents for a particular display device, such as, for example, a cellular phone outfitted with a display and communications software, such as the Nokia 9000. The basic philosophy in this approach is that users of such specialty devices will only have access to a select set of services. Thus, the document for these services must be designed up-front for the accessing device's particular display system. Information may be provided from the distributed network at large, but the desired pages must be pre-defined, and custom information extraction and page formatting software must be written to deliver the information to the small device. This is the approach taken in Unwired Planet's UP.Link service, which uses a proprietary mark-up language (HDML).

In multiple-device authoring, a range of target devices is identified. Then, mappings from a single source document to a set of rendered documents are defined to cover the devices within the identified range. One example of this is the StretchText approach discussed in I. Cooper et al., "PDA Web Browsers: Implementation Issues" University of Kent at Canterbury Computing Laboratory WWW Page, November 1995. In StretchText, portions of the document, potentially down to the word level, can be tagged with a 'level of abstraction' measure. Upon receiving the document, users can specify the level of abstraction they wish to view and are presented with the corresponding detail or lack of detail.

Another example of multiple-device authoring is HTML cascading style sheets (CSS), as described in H. Lie et al. "Cascading Style Sheets", WWW Consortium, September 1996. In cascading style sheets, a single style sheet defines a set of display attributes for different structural portions of a document. For example, all top-level section headings can be defined to be displayed in red 18-point Times font. A series of style sheets may be attached to a document, each with a weight describing that style sheet's desirability to the document's author. The user can also specify a default style sheet. The browser used by the user to access the distributed network can also define a "default" style sheet. Although the author's style sheets normally override the user's style sheets, the user can selectively enable or disable the author's style sheets, providing the user with the ability to tailor the rendering of the document to the user's particular display.

In client-side navigation, the user is given the ability to interactively navigate within a single web page by altering the portion of the single web page that is displayed at any given time. A very trivial example of this is the use of scroll bars in the document display area. A much more sophisticated approach is that taken in the PAD++ system, as described in B. Bederson et al., "Pad++: A Zooming Graphical Interface for Exploring Alternate Interface Physics", Proceedings of ACM UIST'94, ACM Press, 1994, in which the user is free to zoom and pan the device display over the document with infinite resolution. Active Outlining, as described in J. Hsu et al., "Active Outlining for HTML Documents: An X-Mosaic Implementation", Second International World Wide Web Conference, Chicago, Ill., October 1994, has also been implemented as a client-side navigation technique, in which the user can dynamically expand and collapse sections of the document under the respective section headings. Other techniques that fall into this category include semi-transparent widgets, as described in T. Kamba et al., "Using small screen space more efficiently", Proceedings, Computer-Human Interactions: CHI 96, Vancouver, BC, Canada, April 1996, and the Magic Lens system, as described in E. Bier et al., "Toolglass and Magic Lenses: The See-through Interface", SIGGRAPH '93 Conference Proceedings 1993.

Automatic document re-authoring involves developing software that can take an arbitrary document, such as an HTML document, designed to be displayed on a desktop-sized monitor, along with characteristics of the target display device, and re-author the arbitrary document through a series of transformations, so that the arbitrary document can be appropriately displayed on the target display device. This process can be performed either by the client, by the server, or by an intermediary proxy server, such as an HTTP proxy server, that exists solely to provide these transformation services. An example of this latter approach is the UC Berkeley Pythia proxy server, as described in A. Fox et al., "Reducing WWW Latency and Bandwidth Requirements by Real-Time Distillation", Fifth International World Wide Web Conference, Paris, France, May 1996, which performs transformations on web page images. However, the focus of the Pythia proxy server is solely on minimizing page retrieval time. Spyglass Prism is a commercial product that performs automatic re-authoring of HTML documents using fixed transformations associated with page tags or embedded object types. For example, Prism will reduce all JPEG images by 50%.

Finally, web page filtering lets a user see only those portions of a page that user is interested in. Filtering may be performed on an intermediate server, such as an HTTP proxy server, to conserve wireless bandwidth and device memory. However, filtering could also be performed by the client device as a display-management technique. Filter specifications can be based on keyword or regular expression matching, or on page structure navigation and extraction commands. Filtering can be either specified using visual tools or using a scripting language.

SUMMARY OF THE INVENTION

Each of the five approaches, device-specific authoring, multiple-device authoring, client-side navigation, automatic re-authoring and web page filtering, has specific benefits and drawbacks. Device-specific authoring will typically yield the best-looking results due to the direct involvement of human designer. However, device-specific authoring limits the user's access to a small, select set of documents that have been authored for that specific device. Multiple-device authoring, while requiring less total effort per document than device-specific authoring, still requires significantly more manual design work than simply authoring a single version of a document for a single desktop platform. Client-side navigation will work well if a good set of viewing techniques can be developed. However, client-side navigation requires that the entire document be delivered to the client device at once, which may waste valuable wireless bandwidth and memory. Furthermore, the 'peephole' approach taken in PAD++ seems very awkward to use for large documents, and the active outlining technique has limited applicability, as most web pages do not use a strict section/sub-section organization, or use that organization incorrectly.

Automatic re-authoring is thus the ideal approach to providing broad access to web documents or other web content from a wide range of devices, if automatic re-authoring can be made to produce legible, navigable and aesthetically pleasing re-authored documents without loss of information.

This invention provides systems and methods that automatically re-author documents designed for a larger display area for display on a smaller display area.

This invention separately provides systems and methods that automatically transform a document into a plurality of linked subdocuments, where each subdocument requires less display area.

This invention separately provides systems and methods that automatically apply a plurality of different transforms to an original document to generate a plurality of sets of linked subdocuments.

This invention further provides systems and methods that automatically apply the plurality of different transforms to at least one of the plurality of sets of linked subdocuments to generate additional linked subdocuments.

This invention further provides systems and methods that analyze a main subdocument of each set of linked subdocuments to determine a best one of the main subdocuments.

This invention additionally provides systems and methods that determine if the best main subdocument can be displayed in the smaller display area, and if not, that apply further transforms to that main subdocument to further reduce the required display area.

This invention separately provides systems and methods that filter a document to extract a desired portion of the document that is displayable in a smaller display area.

This invention separately provides systems and methods that filter a document to extract a described portion based on a predefined script.

This invention separately provides systems and methods that generate scripts usable to filter a document to extract a desired portion.

This invention separately provides a scripting language usable to write scripts for filtering a document to extract a desired portion.

In one exemplary embodiment, the document re-authoring systems and methods of this invention are implemented on an HTTP proxy that dynamically re-authors requested web pages using a heuristic planning technique and a set of structural page transformations to achieve the best-looking document for a given display size. The automatic document re-authoring according to the systems and methods of this invention can be performed either by the client, by the server, or, in one exemplary embodiment, by an intermediary HTTP proxy server that exists solely to provide these transformation services. Additionally, the automatic document re-authoring systems and methods according to this invention can be performed on a combination of these devices.

The automatic document re-authoring systems and methods of this invention work well with displays found in PDAs. However, when the document re-authoring systems and methods of this invention are applied to the very limited displays found on current cellular phones, the document re-authoring systems and methods of this invention sometimes produces pages that are difficult to navigate. When accessing a distributed network, such as the Internet or an intranet, from a cellular phone, most users are mainly interested in accessing very specific information. The document filtering systems and methods of this invention provide those users with manual control in defining the information they would like to be displayed. The document filtering systems and methods of this invention return only a small portion of a page that is easily navigable. The document filtering systems and methods of this invention are ideal in those situations in which the user is monitoring a particular page whose layout is fixed but whose content is changing, since those users can tune the filters to the format of the page.

The automatic document re-authoring and document filtering systems and methods of this invention provide an automatic document re-authoring capability coupled with document filtering to provide access to arbitrary documents on a distributed network, such as the Internet or an intranet, to devices with limited communications bandwidth and small displays.

The automatic document re-authoring and document filtering systems and methods of this invention intercept requests for documents from a distributed network and return re-authored versions of the requested documents rather than the original requested documents.

In the larger context of mobile and ubiquitous computing, the automatic document re-authoring and document filtering systems and methods of this invention provide a key technology for giving users view-mobility over platforms.

These and other features and advantages of this invention are described in or are apparent from the following detailed description of the preferred embodiments.

BRIEF DESCRIPTION OF DRAWINGS

The preferred embodiments of this invention will be described in detail, with reference to the following figures, wherein.

DETAILED DESCRIPTION OF THE PREFERRED EMBODIMENTS

Figure 1:
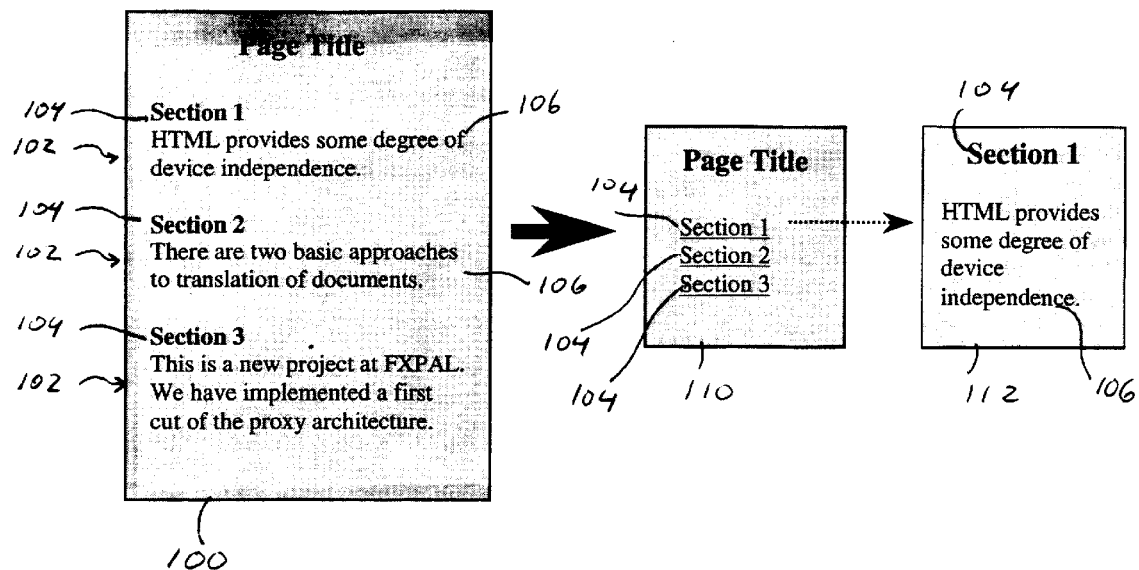
FIG. 1 illustrates re-authoring of a document into a section list page and a number of section pages according to one exemplary embodiment of the document re-authoring systems and methods of this invention.

In the following discussion of the document re-authoring and document filtering systems and methods of this invention, the terms "web page", "web document" and "document" are intended to encompass any set of information retrieved as a single entity from a distributed network, such as an intranet, the Internet, the World Wide Web portion of the Internet or any other known or later developed distributed network. This information can include text strings, images, tables of text strings and images, links to other web pages and formatting information that defines the layout of the text strings, images, tables and links within the web page.

There are many possible automatic document re-authoring techniques, which can be categorized along two dimensions: syntactic vs. semantic techniques and transformation vs. elision techniques. Syntactic techniques operate on the structure of the document, while semantic techniques rely on some understanding of the content. Elision techniques basically remove some information, leaving everything else untouched, while transformation techniques involve modifying some aspect of the document's presentation or content. Table 1 illustrates these dimensions, along with examples of each category:

TABLE 1

Examples of different types of automatic document re-authoring techniques

|  | Elide | Transform |
|---|---|---|
| Syntactic | Section Outlining | Image Reduction |
| Semantic | Removing Irrelevant Content | Text Summarizing |

In order to gain an understanding of the processes required by an automated document re-authoring system, a study was conducted to assess the characteristics of typical web pages, and to identify candidate re-authoring techniques through the process of re-authoring several web pages by hand.

A collection of 'typical' web pages, the Xerox Corporate web site, was initially selected to focus the study. This collection of 3,188 web pages is representative of a state-of-the-art, professionally-designed web site. A variety of statistics were collected on these pages using a web crawler, to help gain an understanding of the structure and content of a typical page. These statistics generally agree with other, larger-scale studies that have been performed across the entire web.

Next, a subset of the pages in the Xerox web site was selected for manual re-authoring. A set of pages from the Xerox 1995 Annual Report was selected and converted by hand for display on a Sharp Zaurus PDA with a 320×240 pixel screen. Detailed notes were kept of the design strategies and techniques used.

Some of the design heuristics learned during this process were:

Keeping at least some of the original images is important to maintain the look and feel of the original document. Common techniques include keeping only the first image, or keeping only the first and last images, i.e., the bookend images, and eliding the rest.

Section headers, i.e., the H1–H6 tags in HTML, are not often used correctly. The section headers are more frequently used to achieve a particular font size and style, such as, for example, bold, if the section headers are used at all. Thus, the section headers cannot be relied upon to provide a structural outline for most documents. Instead, documents with many text blocks can be reduced by replacing each text block with the first sentence or phrase of each block, i.e., first sentence elision.

An initial rule of thumb for images is to reduce all images in size by a standard percentage, dictated by the ratio of the display area that the document was authored for to the display area of the target device. However, images which contain text or numbers can only be reduced by a small amount before their contents become illegible.

Semantic elision can be performed on sidebars that present information which is tangential to the main concepts presented in a page. Many of the Xerox pages had such sidebars, which were simply eliminated in the reduced versions.

Semantic elision can also be performed on images that do not contribute any information to the page, but serve only to improve its aesthetics.

Pages can be categorized, and then re-authored based on their category. Two examples of these are banners and link tables. Banners primarily contain a set of images and a small number of navigation links, often only one, that serve to establish an aesthetic look, but contain little or no content. When space is at a premium, these can usually be omitted entirely. Link table pages are primarily sets of hypertext links to other pages, and thus contain very little additional content. These link table pages can usually be re-formatted into a more compact form that just lists the links in a text block.

Whitespace, which is taken for granted on a large display, is at a premium on small devices. Several techniques were discovered for reducing the amount of whitespace in a page. Sequences of paragraphs, i.e., HTML "P" tags, or breaks, i.e., HTML "BR" tags, can be collapsed into one such paragraph or break. Lists, i.e., HTML "UL", "OL", and/or "DL" tags, take up valuable horizontal space with their indenting and bullets. These lists can be re-formatted into simple text blocks with breaks between successive items, as described in Cooper et al.

In conclusion, to perform document re-authoring two things are required: a set of re-authoring techniques, i.e., a set of page transformations, and a strategy for applying the page transformations. Of the techniques used in the manual re-authoring study, those most amenable to codification were the syntactic elision techniques, including section outlining, first sentence elision, and image elision, and the syntactic transformation techniques, including image size reduction and font size reduction. The design strategy learned during the study included a ranking of the transformation techniques, i.e., try this before that, and a set of conditions under which each transformation or combination of transformations should be applied.

Following the results of the study discussed above, there are two major elements to the document re-authoring systems and methods of this invention: a collection of individual re-authoring techniques that transform documents in various ways; and automated document re-authoring systems and methods that implement a design strategy by selecting the best combination of techniques for a given document/display size pair.

The Section Header Outlining transform provide a very good method for reducing the required display size for structured documents, such as technical papers and reports. The outlining process is shown in FIG. 1.

As shown in FIG. 1, the document 100 is converted into a list of sections page 110 and each section is elided into a page 111. That is, the contents 106 of each section 102 of the document 100 is elided from the document 100 and each section header 104 is converted into a hypertext link. When the hypertext link for any section is selected, the corresponding page 111 of elided content is loaded into the browser. When confronted with multiple section levels (sections, sub-sections, sub-sub-sections, etc.), there are two approaches to performing the elision. The first approach is full outlining, which works by keeping only the section headers and eliding all content, with the results looking like a table of contents for a book. The second approach is to-level outlining. In the to-level outlining, a cutoff level in the section hierarchy is determined and all content below that level, including lower-level section headers, is elided, but all content above that level is kept.

Since most pages have text blocks, even when no section headers are present, the First Sentence Elision transform can be a good way of reducing required screen area. In this technique, each text block is replaced with its first sentence, or, alternatively, its first phrase up to some natural break point. This first sentence or phrase is also made into a hypertext link to the original text block.

The Indexed Segment transform first attempts to find page elements that can logically be partitioned, such as ordered or unordered lists, sequences of paragraphs or tables. This transform takes an input page, segments the content into sub-pages by allocating some number of items to each, and builds and prepends an index page to the collection of sub-pages. The Indexed Segment transform then starts filling output pages with these elements in order until each page is "full" relative to the client's display size. If a single logical element cannot fit on a single output page, then the Indexed Segment transform performs a secondary partitioning that partitions text blocks on paragraph or sentence boundaries.

In the Indexed Segment transform, as much style information as possible is retained for the output elements, by outputting each element embedded within all of its ancestor partitions' HTML tags. The Indexed Segment transform then constructs an index page by copying a section header or first sentence from each element to be output, concatenating the copied portion onto an index page, and creating a hypertext link from each copied portion to the appropriate sub-page. It should be appreciated that the index page itself may also need to be segmented. In the Indexed Segment transform, "Next" and "Previous" navigation links between sequential sub-pages are also added for navigational convenience.

The Table transform recognizes when a table, i.e., the presentation of information arranged in a rectangular grid, on a page cannot be directly sent to the client. In these cases, the Table transform generates one sub-page per table cell, using a top-down, left-to-right order. Tables nested within tables are processed in the same manner. The Table transform uses heuristics to determine when table columns are being used as "navigational sidebars," which is a common practice in commercial HTML web pages. In this case, the Table transform moves these cells to the end of the list of sub-pages, as these cells tend to carry very little content.

Figure 2:
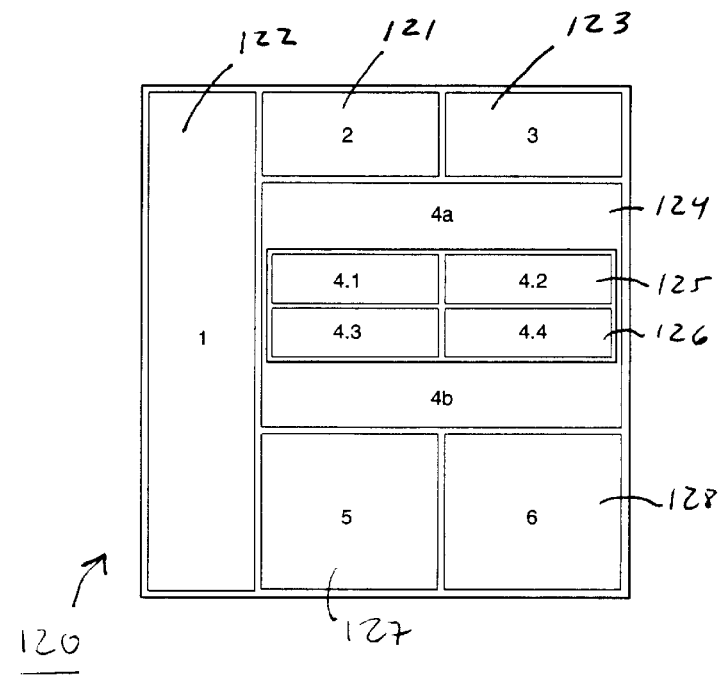
FIG. 2 illustrates a layout table that can be re-authored into a plurality of linked cells according to one exemplary embodiment of the document re-authoring systems and methods of this invention.

FIG. 2 shows a nested table, marking tables with thicker borders than table cells. In the table 120 show in FIG. 2, the cell 122 is identified a as sidebar and will be placed after the cell 128. All of the other cells are placed in their natural order. The six portions of the cell 124, such as the subcells 125 and 126, are each placed in their own sub-page between the subpages containing the subcells 123 and 127, unless they contain only whitespace.

As one can see from the example, nested tables and sidebars complicate the processing of tables. This is especially true if the sidebar is part of an inner table. In that situation, the sidebar should be moved to the end of the inner table, rather than to the end of any surrounding tables. In one exemplary embodiment of the document re-authoring systems and methods of this inventory, the sidebars are moved one table at a time and then all table cells are processed at once, rather than grouping the cells by table.

Images present one of the most difficult problems for automatic document re-authoring, because the decision of whether to keep, reduce, or eliminate a given image should be based on an understanding of the content and role of the image on the page. However, Image Reduction transforms and Image Elision transforms can be applied without content understanding, as long as users are provided a mechanism by which the users can retrieve the original images. In one exemplary embodiment of the systems and methods of this invention, the Image Reduction transform reduces all images in a page by one of a set of pre-defined scaling factors, such as 25%, 50%, and 75%, and making the reduced images into hypertext links that link the reduced images back to the original images.

In addition to the Image Reduction transform, three Syntactic Elision transforms have also been developed for images, the Elide All transform, the First Image Only transform, and the Bookends transform. In the Elide All transform, all images are elided from the document. In the First Image Only transform, all but the first image are elided from the document. In the Bookends transform, all but the first and last images are elided from the document. The elided images are each replaced with their HTML "ALT" text when it is available. Alternatively, the elided images are each replaced with a standard icon when no ALT text is available. The ALT text or standard icon for each elided image is also made into a hypertext link to that original image.

In one exemplary embodiment of the document re-authoring systems and methods of this inventory, if screen space is too limited or the client device cannot display images, the images are removed from the document. However, the removed images may be used as anchors for hypertext links via a client-side image map. It should also be appreciated that if such images are removed, the web site represented by the HTML document can be rendered non-navigable. To accommodate this, in one exemplary embodiment of the document re-authoring systems and methods of this inventory, a transform that extracts the hypertext links from such images and formats them into a text list of link anchors is used. The labels for the text list are extracted from the HTML "ALT" tags of the image map, if present, or from part of the Uniform Resource Locator of the link. This transformation preserves links attached to images for navigation when removing the images.

The overall process of deciding which combination of transforms to apply to a given page for a given client display seems at first to require some form of human artistic ability. However, the automatic document re-authoring systems and methods of this invention capture many of the heuristics used in the manual re-authoring exercise, and do a fairly good job of producing good-looking pages for a given display.

Individual page transformations are ordered by their desirability. In order to determine which combination of transformations should be applied to a given document, the document re-authoring systems and methods of this invention performs a depth-first search of the document transformation space, using many heuristics that describe preconditions for transformations and combinations of transformations. The depth-first search ensures that a "good enough" version of the document is found by using a combination of the most desirable transformations. Only if the more desirable transformations are not applicable or do not reduce the document enough, are the less favored transformations used.

The document re-authoring systems and methods of this invention search a document transformation space in a best-first manner. Each state in this search space represents a version of the document, with the initial state representing the original 'as-authored' document. Each state is tagged with a number representing a measure of merit that represents the quality of the document version at that state. The measure of merit, i.e., the evaluation function or value, for each state is a rough estimate of the screen area required to display the entire document as that document exists in that state. A state can be expanded into a successor state by applying a single transformation technique to the re-authored document as it exists in that state.

At every step in the search process, the most-promising state of the document, i.e., the state with the smallest current display area requirements, is selected and a transformation is applied to transform the document from its current state to a more promising state of the document, if possible. As soon as a state is created that contains a document version that is 'good enough', the search can be halted and that version of the document is returned to the client device for rendering. Alternatively, the search is continued until all content of the original page is contained or represented in a set of good-enough subpages. If the search is exhausted and no document version can be found that is good enough, then the best document found during the search is returned to the client device for rendering. If there are hard size constraints that are not met by the best document, a more destructive transformation is applied that breaks documents up in the middle of paragraphs.

Figure 3:
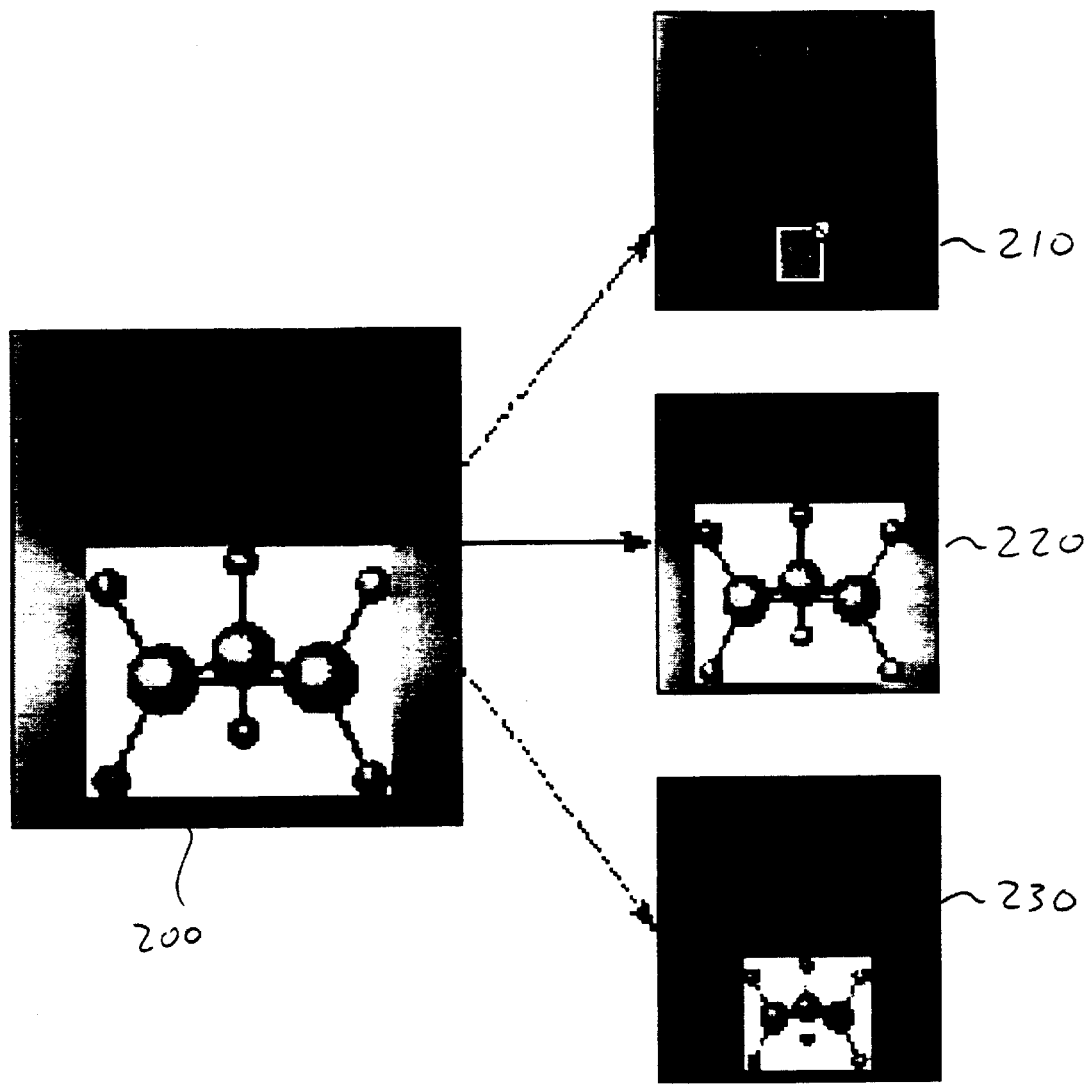
FIG. 3 illustrates how a document can be re-authored into different re-authored states based on applying different transformations according to one exemplary embodiment of the re-authoring systems and methods of this invention.

FIG. 3 shows how different transformations applied to a document 200 result in different resulting re-authored sub-pages 210, 220 and 230. Depending on the information supplied by the user to the systems and methods of this invention, one of the sub-pages 210, 220 and 230 would be selected as the "best" re-authored page. Then, if further re-authoring is required, for example, to generate good-enough subpages for the content removed from the first subpage, or if the best sub-page is not yet "good enough", additional transformations could be applied to the subpages resulting from the selected best re-authored sub-page 210, 220 or 230 or to further re-author the selected best re-authored subpage 210, 220 or 230.

Heuristic information is used in several places by the document re-authoring systems and methods according to this invention, including: the order in which various transformation techniques are applied to a given state; the pre-conditions for each transformation technique; and the determination of when a document version or subpage is 'good enough'. In general, transformations which make minor changes to the document are preferred over those which make more extensive changes. For example, reducing images by 25% is preferable to reducing the images by 75%.

The pre-conditions for each transformation technique specify the other transformations with which that transformation can be combined. For example, it makes no sense to apply both full outlining and first sentence elision to the same document. The pre-conditions also specify the requirements on the content and structure of the document that the technique is being applied to. For example, the Full Outlining transform should be applied only when there are at least three section headers in the document or sub-page being re-authored. The current condition for 'good enough' is fairly simplistic. That is, the search is stopped when the area required by a document or sub-page is a predetermined multiple of the screen area of the client display. In general, this predetermined multiple is greater than 1, and, in one exemplary embodiment, is 2.5. This higher multiple merely assumes that the user doesn't mind scrolling the display a little in one direction.

When a transformation is applied to a document it can result in the document's contents being split into multiple, smaller "sub-pages", as shown in FIG. 2. However, each of these sub-pages may still be too large to download and display on the client. To address this problem, the document re-authoring systems and methods of this invention keep a list of the sub-pages generated by each sequence of transformations attached to the state representing the resulting document version. Once the good-enough version of the document is selected, which is really only a good-enough version of the first sub-page delivered to the client, the list of generated sub-pages for that version is added to a global list of pages to be re-authored. The document re-authoring systems and methods of this invention then re-author each of these to-be-re-authored pages until all of the resulting sub-pages can be delivered to the client. This procedure is shown in pseudocode below, where "reauthor" refers to the best-first re-authoring process described above for a single input page.

```
Digestor(initail_page)
   to_be_reauthored={initial_page}
   to_deliver { }
   while(to_be reauthored !={ })
      next_page=pop(to_be_reauthored)
      best_version_state=reauthor(next_page)
      to_deliver.append(best_version_state.page)
      to_be_reauthored.append(best_version_
         state.sub_pages) return to_deliver
```

All re-authored sub-pages are cached as transformed parse trees. As the user navigates a transformed document and requests sub-pages, the corresponding parse trees are rendered and sent to the client.

The document re-authoring systems and methods of this invention re-author document by first parsing the document and constructing a parse tree or abstract syntax tree (AST) representation of the document. The document re-authoring systems and methods of this invention then apply a series of transformations to the parse tree. Then, the document re-authoring systems and methods of this invention map each resulting transformed parse tree back into a document representation, which may be in a document format that is different from the input format of the original document.

Document transforms are implemented using a standard procedure that includes a condition function that takes a state node in the document version space and returns true if the transform should be applied to the state, and an action function that is called when the transform is actually applied to a state to produce a new state containing a new document version, a new measure of quality, and the resulting sub-pages. Three types of transforms can be defined—1) those which are always run on a page before the planning process starts; 2) those used in the best-first planning process; and 3) those which are always run on a page before it translated from the final abstract syntax tree back into a surface form such as HTML.

Transformations manipulate the parse tree, in the state they are applied to, in order to produce a new version of the document. The manipulations are similar to those described in S. Bonhomme et al., "Interactively Restructuring HTML Documents", Fifth International World Wide Web Conference, Paris, France, May 1996. Whenever portions of the parse tree are elided or transformed, an HTML hypertext link is added into the parse tree to reference the node identifiers of all affected parse tree subtrees, enabling users to request the original portions of the document that have been modified during re-authoring.

The document re-authoring systems and methods of this invention also keep track of which combinations of transforms have already been tried, via a global list of transform sets, assuming that all transformations are commutative, to ensure that no duplicate states are ever constructed.

One exemplary document re-authoring system and method according to this invention, as described above, has been implemented as an HTTP proxy server. The HTTP proxy server accepts a request for an HTML document, retrieves the document from the specified HTTP server, parses the HTML document, constructs the parse tree, or abstract syntax tree, from the retrieved HTML document, labels each of the parse tree nodes with a unique identifier, and then retrieves any embedded images so that the size of the retrieved images can be determined, as necessary. Once this has been accomplished, the document re-authoring systems and methods of this invention are initialized with a state containing the parse tree for the original retrieved document. During each re-authoring cycle, the document re-authoring systems and methods of this invention select the state with the best document version so far, then select the best applicable transformation technique and apply the selected transformation, resulting in a new state and a new document version being generated. It is assumed that the convolution of transformations is always commutative, and several checks are used by the re-authoring software systems and methods of this invention to ensure that redundant states are not constructed.

In one exemplary embodiment of the document re-authoring systems and methods of this invention, fifteen transformation techniques were implemented: FullOutline, OutlineToH1, OutlineToH2, OutlineToH3, OutlineToH4, OutlineToH5, OutlineToH6, FirstSentenceElision, ReduceImages25%, ReduceImages50%, ReduceImages75%, ElideAllImages, FirstimageOnly, BookendImages, and ReduceFontSize.

This exemplary embodiment of the document re-authoring systems and methods of this invention has been implemented in the Java programming language. In addition to functioning as a true proxy server, this HTTP proxy server system can also respond to requests for certain uniform resource locators with documents generated by the HTTP proxy server itself. This is used to provide the user with forms-based control over the HTTP proxy server and the document re-authoring systems and methods. This exemplary embodiment of the document re-authoring system can process even very compex pages in less than 2 seconds on a 200 Mhz Pentium, using Symantec's Java JIT compiler.

Figure 4:
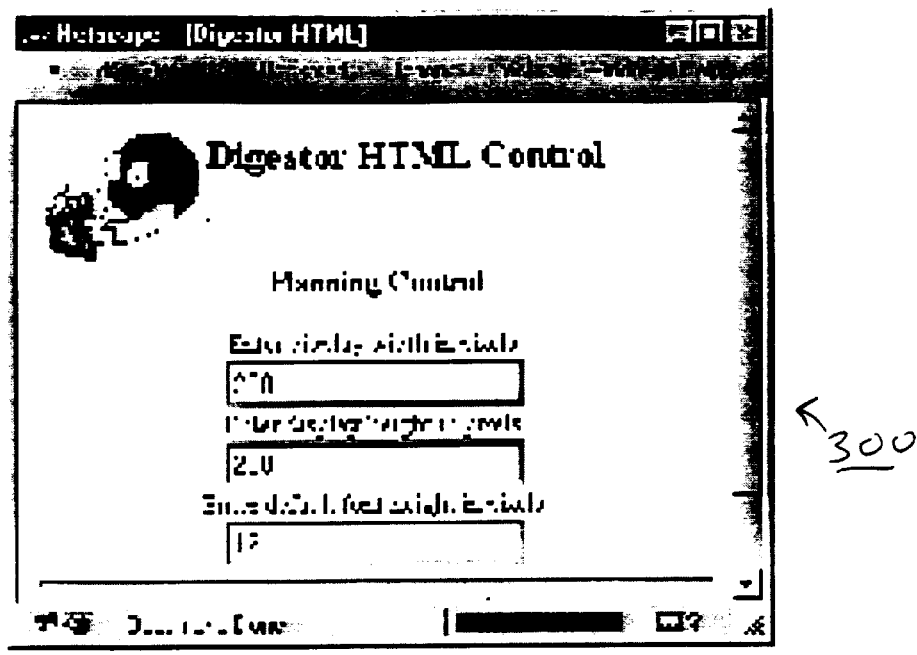
FIG. 4 illustrates one exemplary embodiment of a control form for supplying display information to the HTTP proxy server according to the document re-authoring system and method of this invention.

The first thing that a user of the document re-authoring software systems and methods of this invention must do is specify the size of display for the device being used and indicate the font size of the default browser font being used. This information is needed in order to estimate the screen area requirements of text blocks. To do this, the user requests a specific control uniform resource locator from the HTTP proxy server, resulting in delivery of the form 300 shown in FIG. 4.

Figure 5:
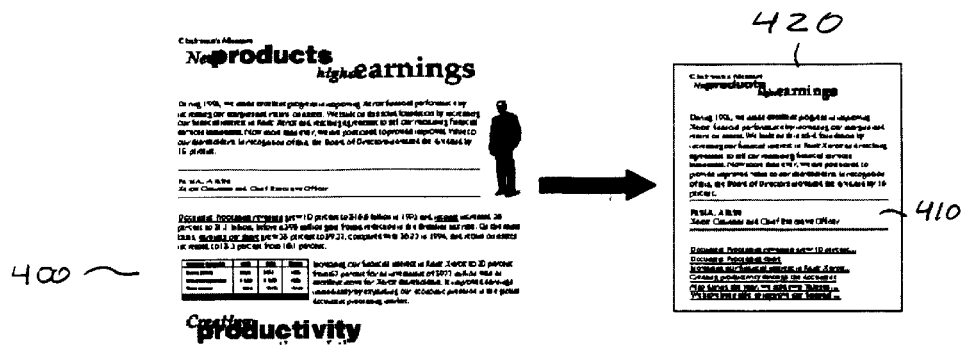
FIG. 5 illustrates one exemplary embodiment of re-authoring an exemplary document according to the document re-authoring systems and methods of this invention.

Once a user has configured the document re-authoring system, the user can start retrieving documents from a distributed network, such as the World Wide Web. The original page 400 and the re-authored page 410 shown in FIG. 5 illustrate the re-authoring capability of the document re-authoring systems and methods of this invention. In this example, this exemplary embodiment of the document re-authoring systems and methods of this invention chose to use 25% image reduction in combination with first sentence elision to render the displayed page 410 from the original page 400. The re-authored page 410 is then displayed on a browser window 420. In this exemplary embodiment of the re-authoring systems and methods of this invention, immediately following retrieval of a page, the user can request a trace of the re-authoring session to determine which transformations had been applied, by requesting another control uniform resource locator from the HTTP proxy server.

Figure 6:
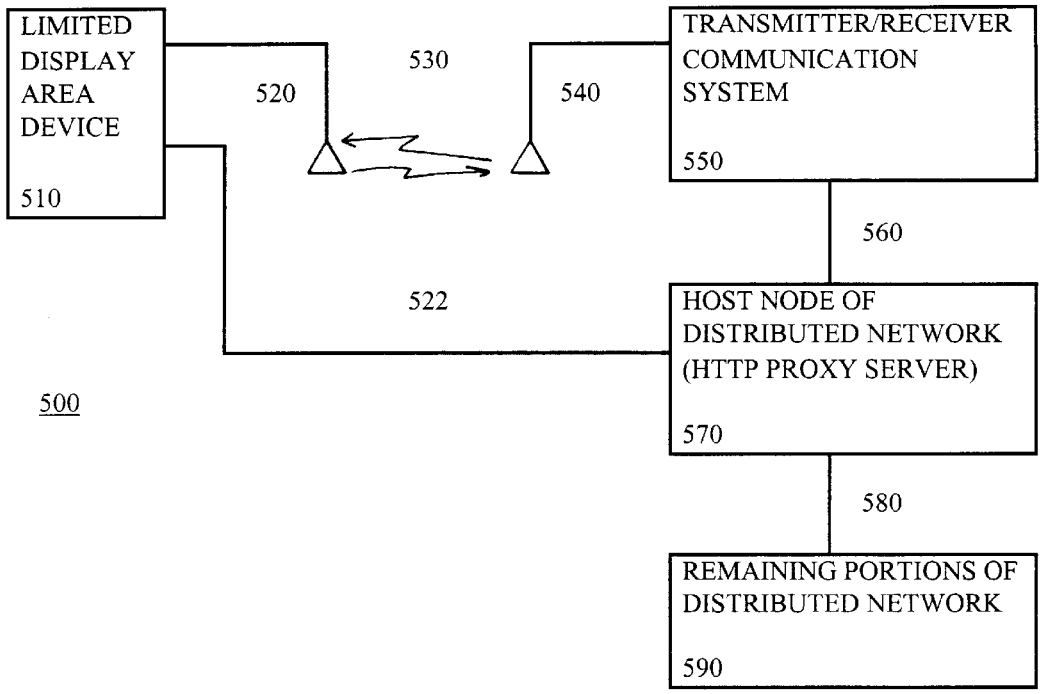
FIG. 6 is a block diagram outlining one exemplary embodiment of the invention in which the document re-authoring systems and methods of this invention are used.

FIG. 6 shows one exemplary embodiment of an environment 500 in which the automatic document re-authoring systems and methods and/or the automatic document filtering systems and methods of this invention will be implemented. As shown in FIG. 6, the environment 500 includes a limited display area device 510 that has a display having a display area that is significantly limited relative to the display area of a monitor for a desktop or a laptop computer. As shown in FIG. 6, the environment 500 further includes a transmitter/receiver communication system 550, a host node 570 of a distributed network and the remaining portions 590 of the distributed network.

In the environment 500, the limited display area device 510 will normally be a personal digital assistance (PDA), a cellular phone or the like that is connected by a wireless communication channel 530 to the transmitter/receiver communication system 550. Thus, as shown in FIG. 6, the limited display area device 510 will normally include an antenna 520, while the transmitter/receiver communication system 550 will normally include a corresponding antenna 540. The limited display area device 510 will normally communicate with the transmitter/receiver communication system 550 over the wireless communications channel 530 using radio frequency signals transmitted between the antennas 520 and 540.

The transmitter/receiver communication system 550 converts the analog or digital signals received from the limited display area device 510 over the communications channel 530 in to a form usable by the host node 570 of the distributed network. The transmitter/receiver communication system 550 then outputs the signals received over the communications channel 530 over a communication link 560 to the host node 570 of the distributed network. It should be appreciated that the communication link 560 can be any known or later-developed communication structure capable of transmitting the appropriate signals between the transmitter/receiver communication system 550 and the host node of the distributed network 570. Because the exact structure of the transmitter/receiver communication system 550 and the communication link 560 will be a matter of design choice depending upon how these elements are implemented, but such design choices will be readily apparent and predictable to those of ordinary skill in the art, these elements will not be further described.

It should also be appreciated that the limited display area device 510 can also be connected to the host node 570 of the distributed network by other than the wireless communication channel 530, such as a communication link 522. That is, the communication link 522 could be any other known communications structure, such as a local area network, a wide area network, a modem connection over the public switched telephone network or a cable television system, or the like. For example, the user of the limited display area device 510, rather than communicating over the wireless communication channel 530, could connect the limited display area device 510 to the public switch telephone network using a modem. The user would then dial directly into the host node 570 of the distributed network.

Regardless of how the host node 570 of the distributed network is ultimately connected to the limited display area device 510, once the host node 570 of the distributed network receives a request for a document to be transmitted to the limited display area device 510, the host node 570 of the distributed network first determines if the requested document is located locally on the host node 570 of the distributed network. If the requested document is not located locally, the host node 570 of the distributed network communicates over a communication structure 580 to the remaining portions 590 of the distributed network to request the document. The particular node of the remaining portions 590 of the distributed network storing that document ultimately will receive the request from the host node 570 over the communication structure 580 and will return the requested document to the host node 570 over the communication structure 580. It should be appreciated that the communication structure 580 can be any known or later-developed communication structure and protocol system for linking together widely located nodes of a distributed network.

Once the host node 570 of the distributed network receives the requested document, an HTTP proxy server executing on the host node 570 of the distributed network re-authors the requested document based on the previously-provided information about the limited display area device 510. A first re-authored page is then transmitted by the host node 570 over either the wireless communication link 530 or the communication link 522 to the limited display area device 510. As the user reviews the delivered page, the user may determine that viewing additional information removed from the re-authored page is required. In this case, the user will send a request over one of the wireless communication link 530 or the communication link 522 to the host node 570 of the distributed network to obtain the desired re-authored sub-page. The host node 570, in response to this request, transmits a further re-authored sub-page of the original document to the limited display area device 510 over one of the wireless communication channel 530 or the communication link 522.

Figure 7:
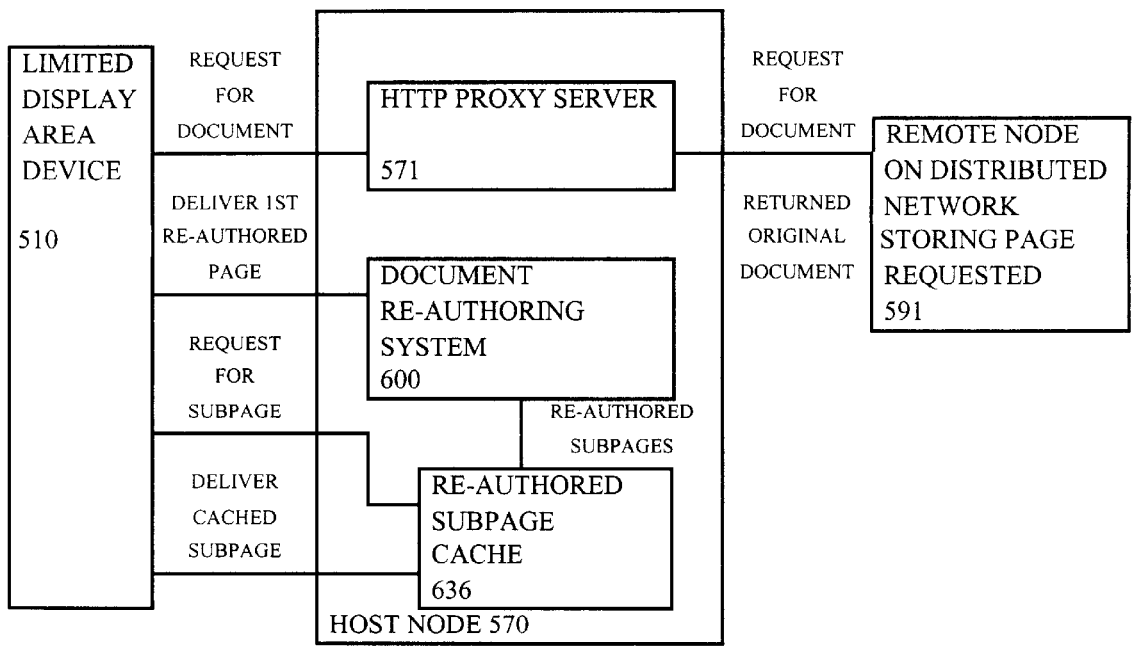
FIG. 7 is a block diagram outlining one exemplary embodiment of the document flow in the document re-authoring systems and methods of this invention.

FIG. 7 shows this information flow in greater detail. As shown in FIG. 7, when the user of the limited display area device 510 wishes to review a particular document presiding on a distributed network, the user sends a request for the particular document from the limited display area device 510 to an HTTP proxy server 571 residing on the host node 570 of the distributed network. The HTTP proxy server 571 then transmits the request for the particular document to the particular remote node 591 on the distributed network that stores the requested page. The particular remote node 591 returns the requested original document to a document re-authoring system 600 residing on the HTTP proxy server 571. The document re-authoring system 600 re-authors the original document into a plurality of subdocuments that are each capable, as closely as possible, of being displayed on the limited display area device 510. The document re-authoring system 600 then delivers the first re-authored to page to the limited display area device 510, while the other re-authored sub-pages are stored in a re-authored sub-page cache 636 of the document re-authoring system 600. Thus, when the user of the limited display area device 510 wishes to view information residing on one of the re-authored sub-pages stored in the re-authored sub-page cache 636, the user causes the limited display area device 510 to transmit a request for that sub-page. The requested cached sub-pages are delivered from the re-authored sub-page cache 636 to the limited display area device 510.

It should be appreciated that, while the HTTP server 571, the document re-authoring system 600 and the re-authored subpage cache 636 are shown in FIG. 7 as independent elements, in general, these elements will be implemented as different portions of a single entity, such as different modules of a single software application.

Figure 8:
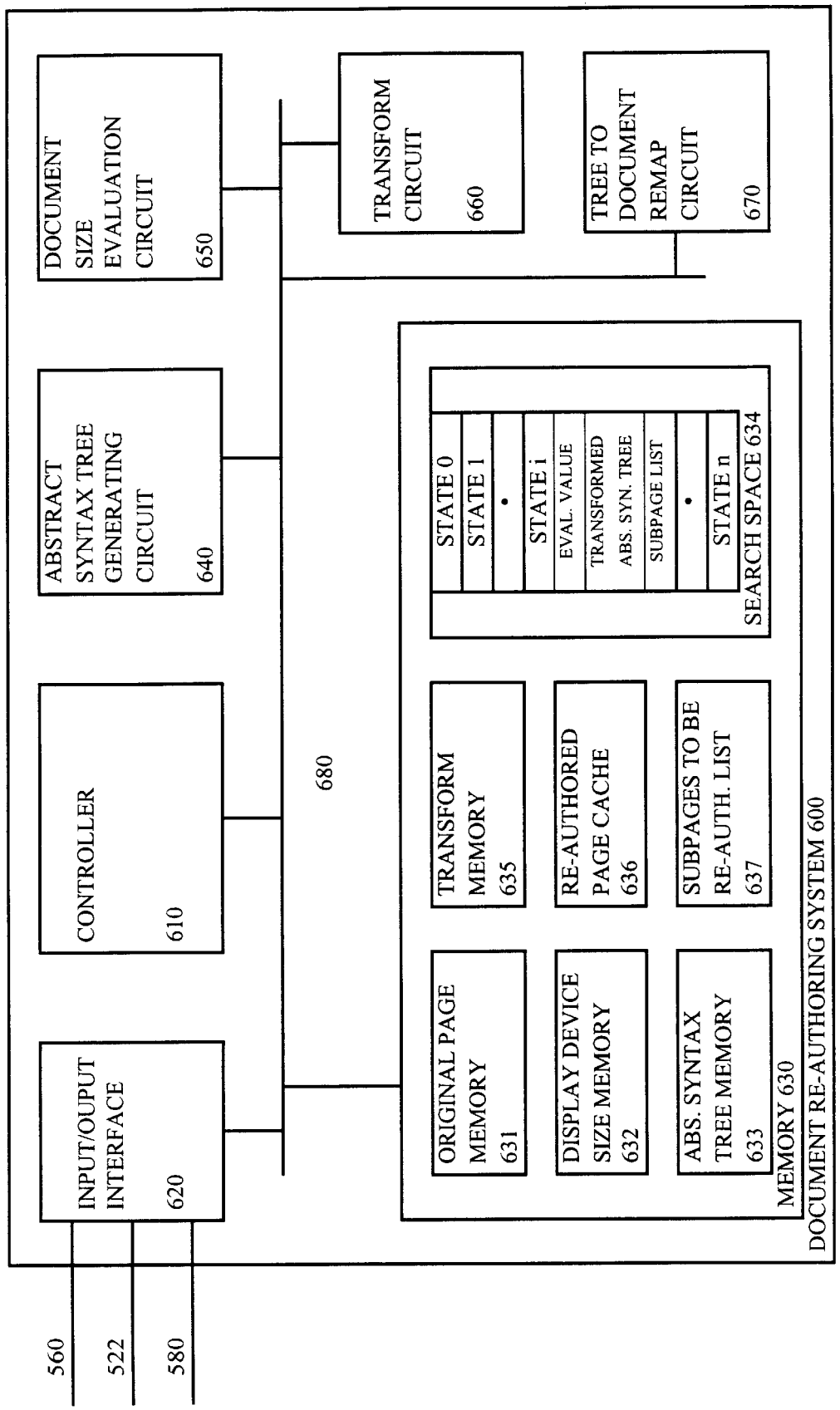
FIG. 8 is a functional block diagram outlining one exemplary embodiment of a document re-authoring system according to this invention.

FIG. 8 is a functional block diagram outlining in greater detail one exemplary embodiment of the document re-authoring system 600. As shown in FIG. 8, the document re-authoring system 600 includes a controller 610, an input/output interface 620, a memory 630, an abstract syntax tree generating circuit 640, a document size evaluation circuit 650, a transform circuit 660 and a tree-to-document remap circuit 670, each interconnected by a data/control bus 680. The communication links 522, 560 and 580 discussed above with respect to FIG. 6 are each connected to the input/output interface 620.

The memory 630 includes a number of functionally distinct portions, including an original page memory portion 631, a display device size memory portion 632, an abstract syntax tree memory portion 633, a search space portion 634, a transform memory 635, the re-authored page cache 636 described above with respect to FIG. 7, and a sub-pages to be re-authored list 637. The original page memory portion 631 stores the returned original document returned from the remote node 591 of the distributed network that stores the page requested by the limited display area device 510.

The display device size memory 632 stores a number of form documents used by the document re-authoring system 600 to obtain various parameters about the limited display area device 510 used by the document re-authoring system 600 to re-author a page for a particular limited display area device 510. The display device size memory 632 also stores the particular size parameters for at least one limited display area device 510. It should be appreciated there are a number of different possible ways of implementing the document re-authoring system 600 relative to the various parameters about the limited display area device 510. In one exemplary embodiment, the document re-authoring system 600 can store the various parameters for a particular limited display area device 510 only for as long as that limited display area device 510 remains continuously connected to the document re-authoring system 600. In this case, each time a particular limited area device 510 is reconnected to the document re-authoring 600, the document re-authoring system 600 would send the various forms used to obtain the various parameters about the limited display area device 510 and the user would be required to re-supply these various parameters each time the document re-authoring system 610 was initially accessed.

While this reduces the required size for the display device size memory 632 and does not require any system for identifying a particular limited display area device 510, this system places a larger burden on the user of the limited display area device 510 or requires a process for automating the supply of information from the limited display area device 510 to the document re-authoring system 600. This automation could be provided, for example, by the document re-authoring system 600 requesting the information from the limited display area device 510. If the information has already been entered by the user during a previous session with the document re-authoring system 600, and that information was stored at that time on the limited display area device 510, the user would not need to be actively involved in re-supplying the information to document re-authoring system 600.

Alternatively, the information could be stored in the display device size memory 632, along with an identification code that the user can cause to be supplied from the limited display area device 510 when beginning a session with the document re-authoring system 600. By supplying the identification code to the document re-authoring system 600, the user again would not be required to re-supply all of the various parameters about the limited display area device 510 each time the document re-authoring system 600 is accessed.

In any case, the document re-authoring system 600 uses the various parameters about the limited display area device 510, as described above, when re-authoring the original page stored in the original page memory 631 so that each re-authored page will fit, as closely as possible, on to the small display area of the limited display area device 510.

The abstract syntax tree memory portion 633 stores the abstract syntax tree generated form the original document stored in the original page memory 631 by the abstract syntax tree generating circuit 640. The transform memory portion 635 stores the various transforms described above, as well as the conditions under which each transform can be applied and the conditions regarding which transforms are not usable with various other ones of the transforms. The transform memory 635 also stores an indication of the desirability of applying any particular transform to a particular original or re-authored page. That is, as described above, the various transforms have general order that emphasis applying a more limited transform, such as reducing an image by a small about, over a more radical transform, such as reducing an image by a large amount or removing the image completely.

The re-authored page cache 636 stores the abstract syntax tree corresponding to each re-authored page or sub-page as the document size evaluation circuit indicates that the abstract syntax tree for a particular re-authored page or sub-page is good enough, based on the various parameters about the limited display area device 510 stored in the display device size memory 632. The sub-pages to be re-authored list 637 stores the abstract syntax trees for those sub-pages generated by transforming the original document or an earlier sub-page. These sub-pages will generally contain the images of any reduced-size images or any elided images, as well as the full text of any text segments that have had content elided from them.

Finally, the search space memory 634 stores a number of states generated by the transform circuit 660 as it applies the various transforms stored in the transform 635 to either the original document stored in the original page memory 631 or to various sub-pages stored in the sub-pages to be re-authored list 637, based on the particular state of the search space currently being manipulated.

In particular, each state i in the search space 634 includes an evaluation value portion, a transformed abstract syntax tree portion and a sub-page list portion. The evaluation valued portion stores the evaluation value generated for the re-authored page or sub-page corresponding to the state i generated by the document size evaluation circuit 650. The transformed abstract syntax tree portion stores the transformed abstract syntax tree for the state i generated by the transform circuit 660 by applying one of the transforms in the transform memory 635 to the parent state to the state i. The sub-page list portion stores the list of sub-pages generated to store any original content removed from the page corresponding to the state i when the transform circuit 660 applies the particular transform used to generate that state i.

It should be appreciated that state 0 corresponds to the original document stored in the original page memory 631. In particular, the evaluation value portion of state 0 corresponds to the evaluation value generated for the original document before any re-authoring. In this state 0, the transformed abstract syntax tree portion stores the original un-transformed abstract syntax tree generated by the abstract syntax tree generating circuit for the original document. Finally, before state 0, the sub-page list will be empty, as the original document contains all of the original information and therefore, no sub-pages are required.

Figure 9:
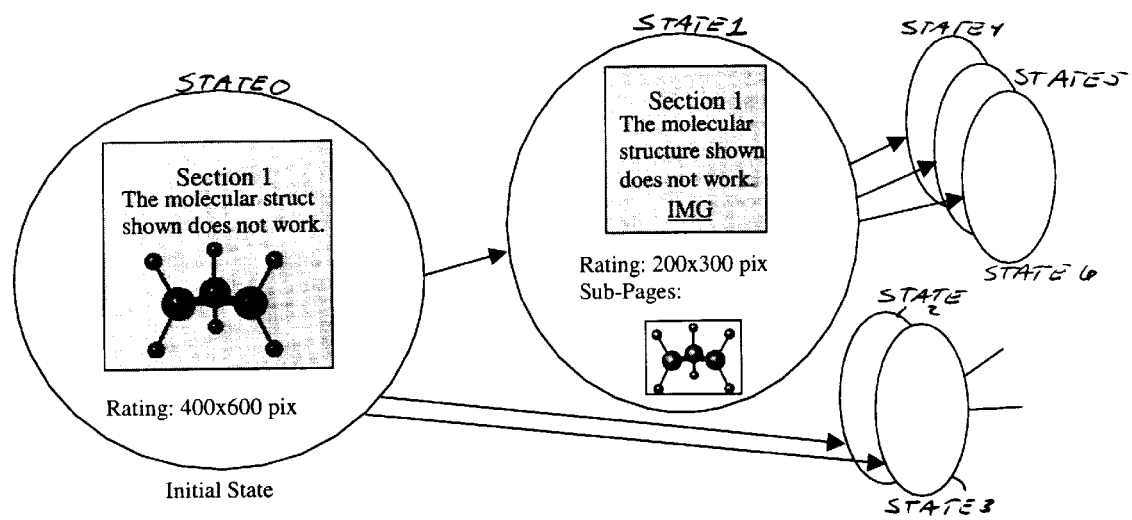
FIG. 9 is one exemplary embodiment of the document version search space of the document re-authoring systems and methods of this invention.

FIG. 9 graphically illustrates various states stored in the search space memory portion 634. In particular, FIG. 9 shows a document comprising a section header, a text paragraph, and an image. As shown in FIG. 9, in the initial state, i.e., state 0, the original document has not been transformed. This initial state also shows the original rating, i.e., the evaluation value, generated for the original document. FIG. 9 also shows the state 1 generated from the state 0 by applying the "elide all images" transformed to the document of state 0. As shown in state 1, the re-authored sub-page of state 1 contains the section header and the text but does not contain the image. Rather, in place of the image, the re-authored sub-page of state 1 contains a link labeled "IMG" that links the re-authored page of state 1 to the sub-page storing the image elided from the re-authored subpage of state 1. State 1 also indicates the evaluation value for this re-authored document. As shown in FIG. 9, the size requirements for the re-authored page are now one-quarter of the size requirements of the original, un-re-authored page.

FIG. 9 also indicates that two additional states, state 2 and state 3, were generated by applying other transforms to the document of state 0. Finally, FIG. 9 shows three additional states, state 4, state 5 and state 6, generated by applying additional transforms to the re-authored document of state 1 or to the sub-page of state 1. For example, if the sub-page containing the image is still too large to be displayed on the limited display area device 510, an intermediate sub-page generated by applying the "reduced image by 25%", the "reduce image by 50%", or the "reduce image by 75%" transforms to the image to obtain a re-authored document good enough to be displayed on the limited display area device 510.

Currently, in operation, the document re-authoring system 600 of FIG. 8 receives the returned original document over the communication link 580. The received or general document is input through the input/output interface 620 and is stored in the original page memory 631 under the control of the controller 610. Then, the abstract syntax tree generating circuit 640, under control of the controller 610, inputs the original document from the original page memory portion 631 and generates an abstract syntax tree from that original document. The abstract syntax tree generated by the abstract syntax tree generating circuit 640 is then stored in the abstract syntax tree memory portion 633 of the memory 630 under control of the controller 610.

The document size evaluation circuit 650 then inputs, under control of the controller 610, the abstract syntax tree corresponding to the original document stored in the original page memory 631 and the various parameters from the display device size memory 632 about the particular limited display area device 510 to which the re-authored documents are to be returned. The document size evaluation circuit 650 then generates an evaluation value and stores that evaluation value in state 0 of the search space memory portion 634. The document size evaluation circuit 650 also outputs an indication to the controller 610 whether the document of state 0 is good enough for outputting it to the limited display area device 510 over one of the communication links 522 or 560. If the original document is already good enough, the original document is immediately returned without further transformation.

Then, the transform circuit 660, under control of the controller 610, inputs the document of state 0, as represented by the abstract syntax tree for that state, and applies one of the transforms stored in the transform memory 635 to the abstract syntax tree of the input state. In particular, the transform circuit 660 first determines, for the current state i, whether the selected transform should be applied to the current state i of the document. For example, as described above, if the current state i of the document does not contain any images, there is no point in applying any of the image reduction or elision transforms to this state of the document. Furthermore, if the "elide all but first image" transform has already been applied to obtain the current state i of the image, there is no point of applying the "elide all but first and last images" transform to this current state i.

Assuming the current transform selected by the transform circuit 660 is properly applicable to the current state i of the document, as indicated by the transformed abstract syntax tree for the current state i, the transform circuit 660 applies that transform to the abstract syntax tree for that state to generate a child state j. The child state j includes the further transformed abstract syntax tree and a sub-page list indicating the sub-pages that remain to be transformed based on the content elided from the original document necessary to reach this child state j. Finally, the document size evaluation circuit 650, under control of the controller 610, evaluates the document obtained in the child state j to determine if that resulting document is good enough for outputting to the limited display area device 510. That evaluation value is then stored in the newly-created child state j.

After the transform circuit 660 has generated the new child state j, the transform abstract syntax tree for that state j is output to the document size evaluation circuit 650 for evaluating the size requirements of the document corresponding to the state j.

Once the abstract syntax tree for the first page of the transformed document is determined to be good enough, that abstract syntax tree is output to the tree-to-document remap circuit 670, which renders the first re-authored sub-page from that abstract syntax tree. That first re-authored sub-page is output from the tree-to-document remap circuit 670 to the input/output interface 620 and ultimately is transmitted to the limited area display device 510. At the same time, the transform circuit 660 continues to apply additional transforms to any subpages resulting from transforming the original document into the first good-enough re-authored subpage. As each such subpage is transformed into a good-enough subpage, the abstract syntax tree for each such good-enough subpage is stored in the re-authored page cache 636 until a request for that subpage is received by the document re-authoring system 600 from the limited area display device 510.

Once a request for that subpage is received by the document re-authoring system 600, the abstract syntax tree for that requested subpage is output to the tree-to-document remap circuit 670, which renders the requested re-authored sub-page from that abstract syntax tree. That requested re-authored sub-page is output from the tree-to-document remap circuit 670 to the input/output interface 620 and ultimately is transmitted to the limited area display device 510.

It should be understood that each of the circuits and other elements shown in FIGS. 6–8 can be implemented as portions of suitably programmed general purpose computers. Alternatively, each of the circuits shown in FIGS. 6–8 can be implemented as physically distinct hardware circuits within one or more ASICs, or using FPGAs, PDLs, PLAs, or PALs, or using discreet logic elements or discreet circuit elements. The particular form each of the circuits shown in FIGS. 6–8 will take is a design choice and will be obvious and predictable to those of ordinary skill in the art.

It should also be appreciated that the links 522, 560 and 580 can by any known or later-developed device or system for connecting the limited display area device 510 to the host node 570 or the host node 570 to the transmitter/receiver communication system 550 or the remaining portions 590 of the distributed network. Thus, the links 522, 560 and 580 can each be implemented as a direct cable connection, a connection over a wide-area network or a local-area network, a connection over an intranet, or a connection over the Internet. In general, the links 522, 560 and 580 can be any known or later-developed connection system or structure usable to connect the corresponding apparatus to the host node 570 over the distributed network.

It should further be appreciated that the document re-authoring system 600 is preferably implemented on a programmed general purpose computer. However, the document re-authoring system 600 can also be implemented on special purpose computer, a programmed microprocessor or microcontroller as a peripheral integrated circuit elements, and ASIC or other integrated circuit, a digital signal processor, a hardwired electronic or logic circuit such as a discreet element circuit, a programmable logic device such as PLD, PLA, FPGA or PAL, or the like. In general, any device, capable of implementing a finite state machine that is in turn capable of implementing the flowcharts shown in FIGS. 11A–14, can be used to implement the document re-authoring system 600.

The memory 630 shown in FIG. 8 is preferably implemented using static or dynamic RAM. However, the memory 630 can also be implemented using a floppy disk and disk drive, a writeable optical disk and disk drive, a hard drive, flash memory or any other know or later-developed volatile or non-volatile alterable memory. In addition, the memory 630 can further include one or more portions storing control programs for the controller 610. In general, such control programs are preferably stored using non-volatile memory, such as flash memory, a ROM, a PROM, and EPROM or EEPROM, a CD-ROM and disk drive, or any other known or later-developed alterable or non-alterable non-volatile memory.

Figure 10:
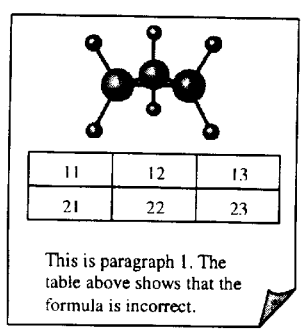
FIG. 10 is one exemplary embodiment of an image and the abstract syntax tree generated from that image according to this invention.
Figure 10:
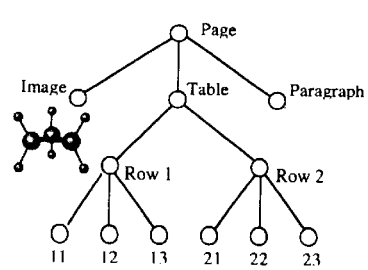

FIG. 10 shows another exemplary original document and the abstract syntax tree that is generated from that document. As shown in FIG. 10, the document includes an image, a table having two rows of three columns each, and a text paragraph. The resulting abstract syntax tree generated from this page includes a root node labeled "Page". Three intermediate nodes, "Image", "Table" and "Paragraph" corresponding to each of the image, the table and the text paragraph, respectively, extend from the root "Page" node. Furthermore, as shown in FIG. 10, two intermediate nodes, "Row 1" and "Row 2", corresponding to each of the two rows, respectivley, extend from the intermediate "table" node. Finally, three nodes, corresponding to each of the three cells in each row, respectively, extend from each of the "Row 1" and "Row 2" nodes.

To re-author the page shown in FIG. 10, for example, the first transform to be applied would generally replace the full size image with a node representing an image reduced by 25%. Then, a new abstract syntax tree having a root node corresponding to the full-sized image would be formed and linked by a hypertext link to the reduced image node of the transformed abstract syntax tree. If the re-authored page having the image reduced by 25% is not yet good enough, the image reduction transformation reducing the image by 50%, 75% and then completely removing the image would be applied in turn to the original document until a good-enough image was obtained. In each case, the abstract syntax tree would contain a link from the transformed node corresponding to the image to the separate abstract syntax tree containing the full-sized image. If removing the image completely is still insufficient to result in a good-enough re-authored document, the table transform can be applied, as described above, to transform the table into a set of linked individual cells, or the First Sentence Elision transform can be applied to move the text paragraph into a separate subpage.

Figure 11A:
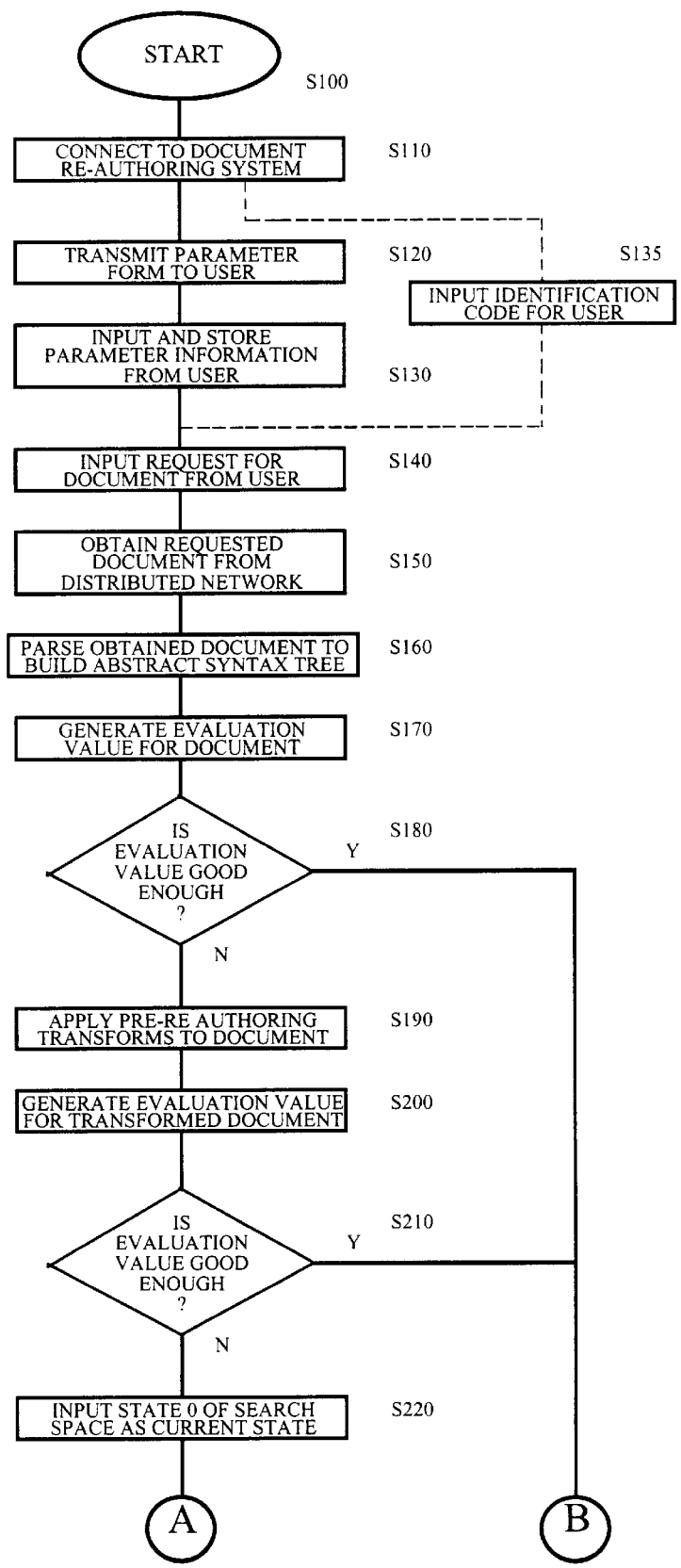
FIGS. 11A and 11B outline one exemplary embodiment of a method for document re-authoring according to this invention.
Figure 11B:
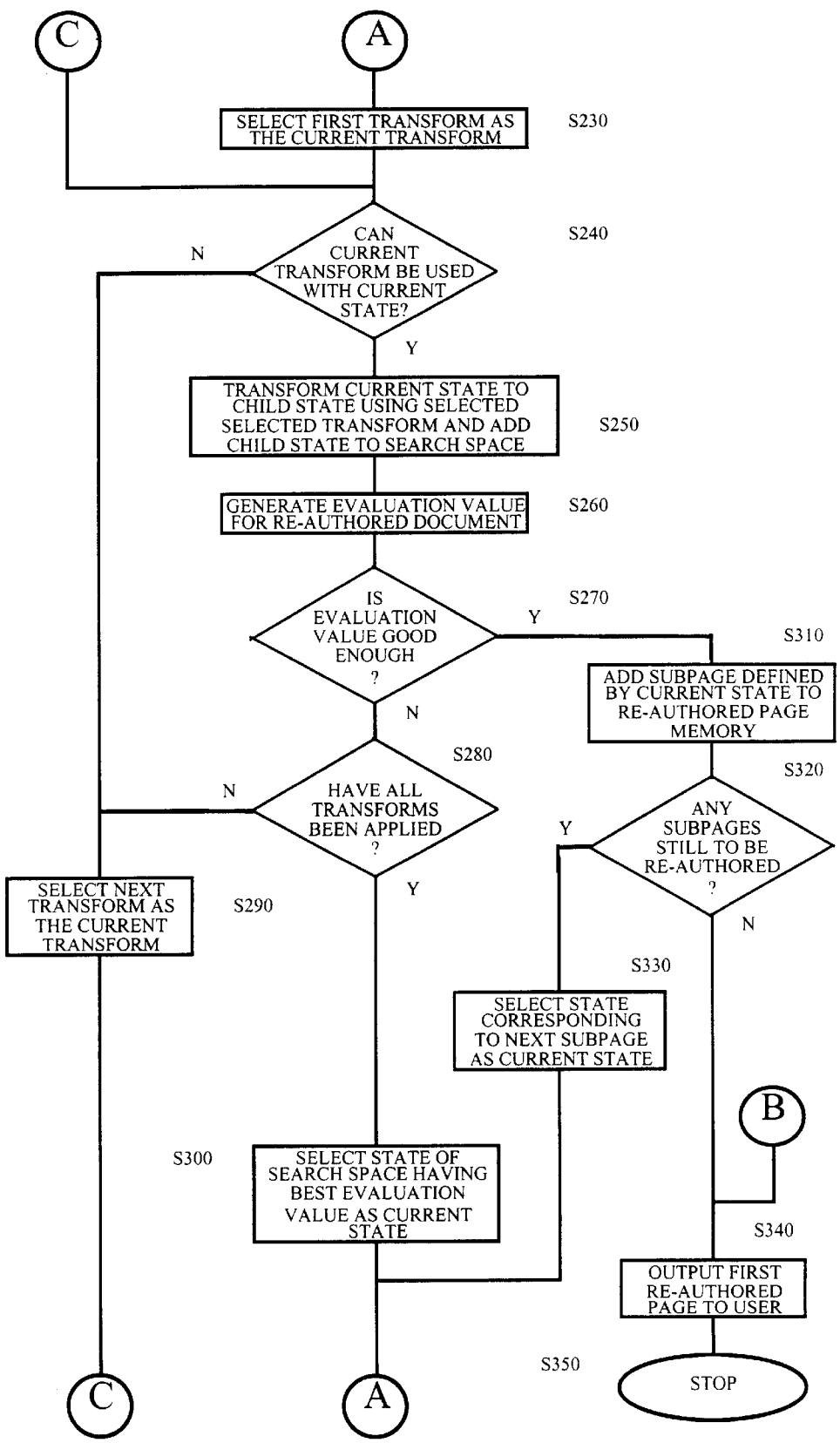

FIGS. 11A and 11B are a flowchart outlining one exemplary method for re-authoring a page according to this invention. As shown in FIG. 11, control begins in step S100 and continues to step S110, where a user connects a device having a limited display area to a re-authoring system according to this invention. Then, in step S120, the re-authoring system transmits one or more parameter forms to the user to obtain the necessary information about the limited display area necessary to be able to re-author a requested page for display on the limited display area device. Then, in step S130, the re-authoring system inputs the parameter information from the user and stores the input parameter information in a memory. Control then continues to step S140.

As indicated above with respect to FIGS. 6 and 7, the parameter information gathering process outlined in steps S120 and S130 can be automated so that the user does not have to be actively involved in performing steps S120 and S130. Alternatively, as shown in optional step S135, steps S120 and 130 can be replaced by step S135. In step S135, the user either actively inputs, or the limited display area device automatically outputs, an identification code to the re-authoring system identifying previously-stored parameter information for this particular limited display area device. Control then again continues to step S140.

In step S140, a request for a document on the distributed network is output to the re-authoring system from the user using the limited display area device. Then, in step S150, the re-authoring system obtains the requested document from the distributed network. Next, in step S160, the obtained document is parsed to build an abstract syntax tree of that document. Then, in step S170, an evaluation value for the obtained original document is generated from the abstract syntax tree. Control then continues to step S180.

In step S180, the evaluation value is analyzed to determine if the obtained document is good enough to be displayed on the limited display area device without any re-authoring. If so, control jumps to step S340. Otherwise, control continues to step S190.

In step S190, one or more pre-re-authoring transforms are applied to the abstract syntax tree of the obtained, original document. These pre-re-authoring transforms are used, for example, to remove portions of the original document that do not contain any content but that consume display area. For example, such portions of the obtained document include banners and other graphical elements that are merely identifying links to other pages or portions of the page. These contentless images are replaced by text links. However, because such transforms do not actually remove any content from the image, re-authoring the page in this way does not require the removed portions to be retained. Other portions that can be removed without effecting the content of the original document include formatting commands that add whitespace and other contentless esthetic formatting to the original document. Finally, other transforms can be applied that convert the various fonts of a document to a single standard font to eliminate unnecessary display area requirements of large and complicated fonts.

Once the pre-re-authoring transforms are applied in step S190, control continues to step S200, where an evaluation value for the pre-re-authored original document is generated. Then, in step S210, the pre-re-authored documents evaluation value is checked to determine if the pre-re-authored document is good enough to be displayed on the limited display area device. If so, control again jumps to step S340. Otherwise, control continues to step S220.

In step S220, state 0 of the search space, corresponding to the pre-re-authored document, is selected as the current state of the search space. Then, in step S230, a first transform is selected as the current transform. Then, in step S240, a determination is made whether the current transform can be applied to the abstract syntax tree of the current state. As outlined above, various ones of the transforms have conditions that indicate whether that transform can be efficiently applied to the current re-authored document or whether the current transform is properly combinable with previously applied transforms. If the current re-authored document corresponding to the current state is such that the current transform can be efficiently applied and does not conflict with any previously applied transforms, control continues to step S250. Otherwise, control jumps to step S290.

In step S250, the current state is transformed to a child state using the current transform and the resulting child state, including the transformed abstract syntax tree and any resulting sub-pages, are added to the search space. Then, in step S260, an evaluation value is generated for the document corresponding to the transformed abstract syntax tree corresponding to the child state generated in step S250. Next, in step S270, the evaluation value is analyzed to determine if the document corresponding to the child state generated in step S250 is good enough to be displayed on the limited display area device. If the evaluation value indicates the re-authored document or sub-page is good enough, control jumps to step S310. Otherwise, control continues to step S280.

In step S280, a determination is made whether all transforms have been applied to the current state. If all of the transforms have not been applied, control continues to step S290. Otherwise, control jumps to step S300.

In step S290, the next transform is selected as the current transform and control jumps back to step S240. In contrast, in step S300, the state of the search space having the best evaluation value is selected as the current state. Control then jumps back to step S230.

In step S310, the document or sub-page defined by the current state is added to the re-authored page cache as a first re-authored page or a next re-authored sub-page suitable for delivery to the requesting limited display area device. Then, in step S320, a determination is made whether there are any sub-pages resulting from the good-enough sub-page that has been added to the re-authored page cache. If there are any such sub-pages that still need to be re-authored, control continues to step S330. Otherwise, control jumps to step S340.

In step S330, a state of the search space corresponding to one of the sub-pages to be re-authored is selected as the current state. Control then jumps back to step S230. In contrast, since there are no further sub-pages that need to be re-authored, in step S340, the first re-authored page is output to the requesting limited display area device. Then, in step S350, the control routine ends.

Figure 12:
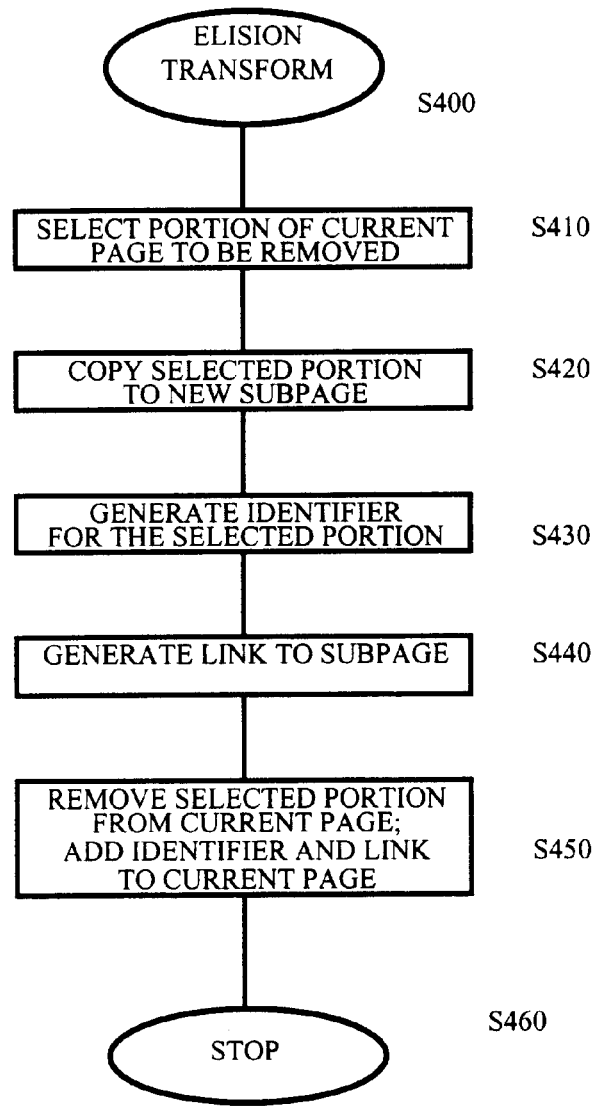
FIG. 12 is one exemplary embodiment of a method for performing elision transformation according to this invention.

FIG. 12 outlines one exemplary embodiment of an elision transform according to this invention. As shown in FIG. 12, the elision transform routine begins in step S400, and continues to step S410, where a portion of a current page or sub-page to be removed is selected. Then, in step S420, the selected portion is copied into a new sub-page. Next, in step S430, an identifier is generated for the selected portion. In general, the identifier will be generated using some content of the selected portion. For example, if the selected portion is a paragraph or other text string, the identifier will be the first sentence or the first portion of the first sentence of the selected text portion. If the selected portion is an image, the identifier could be a portion of text used to identify the image in the web document. Control then continues to step S440.

In step S440, a link is generated to link the current page or sub-page with generated sub-page. Then, in step S450, the selected portion is removed from the current page or sub-page and the identifier and the link are added to the current page. Next, in step S640, the control routine stops.

Figure 13:
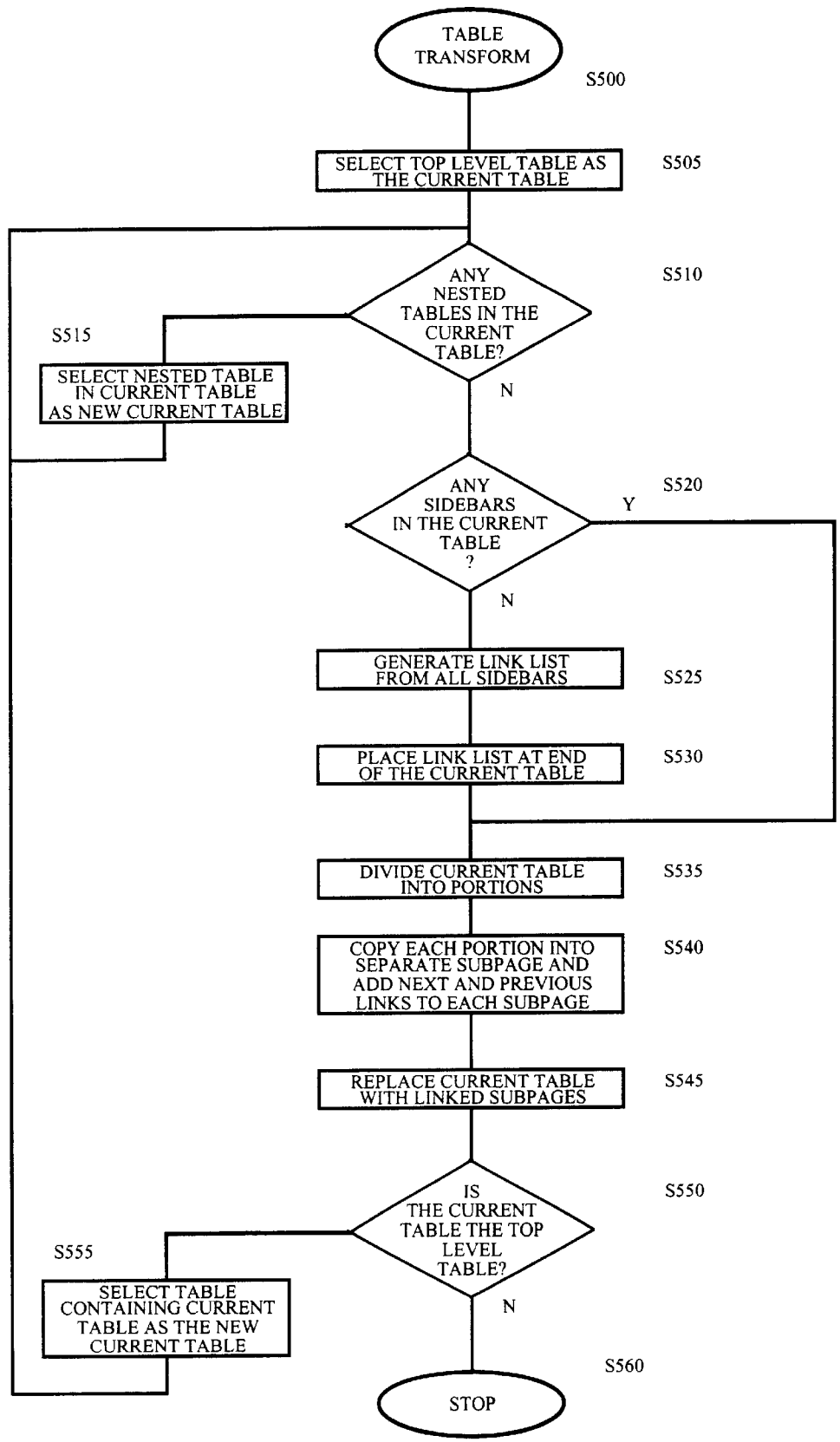
FIG. 13 is one exemplary embodiment of a method for performing table transformation according to this invention.

FIG. 13 outlines one exemplary embodiment of a table transform according to this invention. As shown in FIG. 13, the table transform begins in step S500 and continues to step S505, where a top level table is selected as the current table. Then, in step S510, the current table is checked to determine if there are any nested tables in the current table. If so, control continues to step S515. Otherwise, control jumps to step S520. In step S515, one nested table of the current table is selected as the new current table. Control then jumps back to step S510, to determine if there are nested tables in this nested table selected as the current table.

Once there are no nested tables in the current table, in step S520, the current table is checked to determine if there are any sidebars in the current table. If so, control continues to step S525. Otherwise, control jumps to step S535. In step S525, a link list is generated from all of the links in all of the sidebars of the current table. Then, in step S530, the link list is placed at the end of the current table. Control then continues to step S535.

In step S535, the current table is divided into two or more portions. In particular, as indicated above, one method for dividing the current table into portions is to divide each cell of the table into a separate portion. Then, in step S540, each portion of the current table is copied into a separate new sub-page, and "Next" and "Previous" links are added to each such sub-page. Next, in step S545, the current table is replaced with the set of linked sub-pages generated in step S540. Control then continues to step S550.

In step S550, the current table is checked to determine if it is the top level table. If not, there is at least one higher level table that still needs to be divided into portions. Accordingly, control continues to step S555. Otherwise, control jumps to step S560.

In step S555, the table that contains the current table is selected as the new current table. Control then jumps back to step S510, to determine if there any more nested tables in the current table. In contrast, in step S560, the control routine ends.

Figure 14:
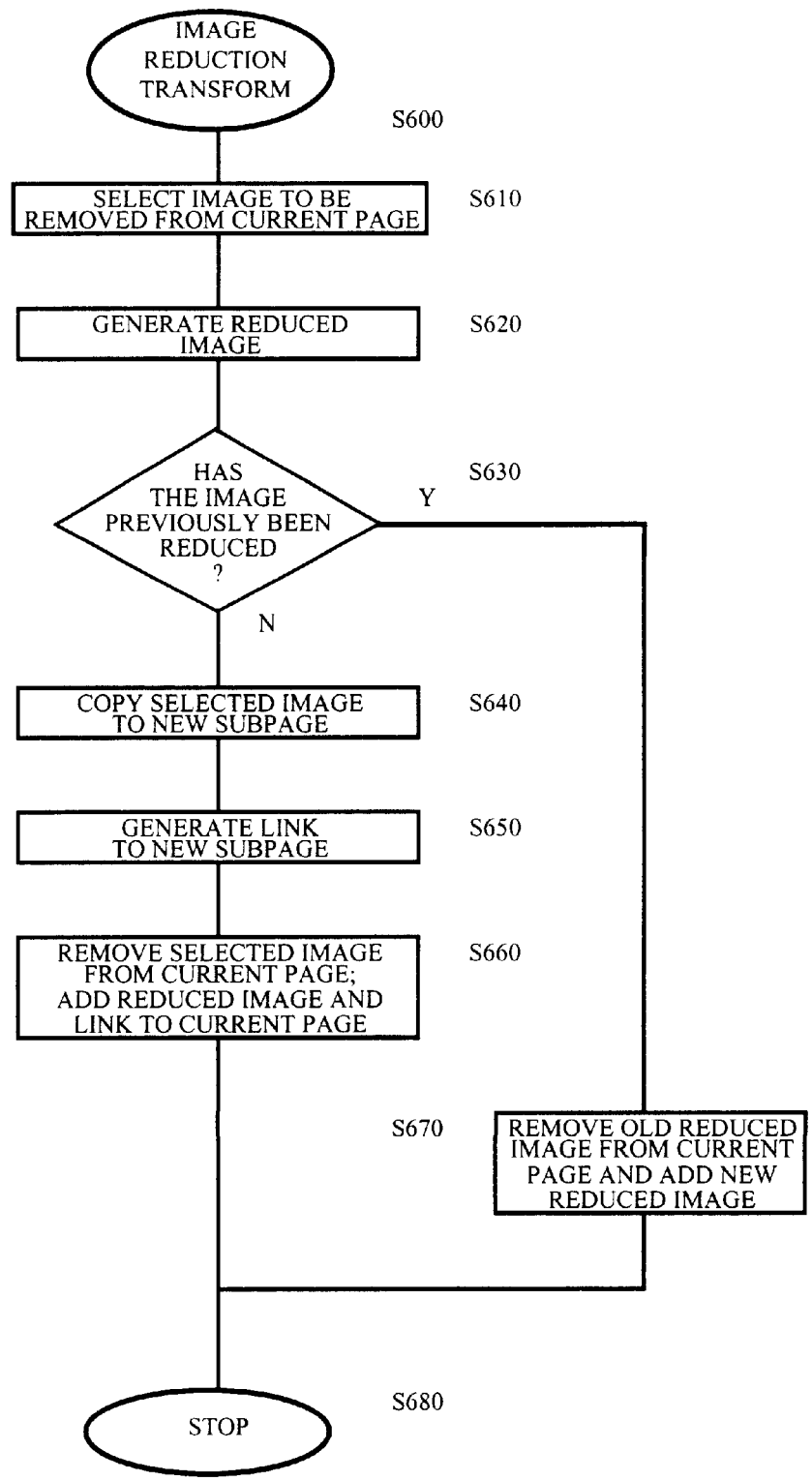
FIG. 14 is one exemplary embodiment of a method for performing image reduction transformation according to this invention.

FIG. 14 is a flowchart outlining one exemplary embodiment of an image reduction transformation according to this invention. Beginning in step S600, the image reduction transformation continues to step S610, where the image to be reduced in the current sub-page is selected. Then, the reduced image is generated based on the reduction factor associated with the particular image reduction transformation being applied. Then, in step S630, the current sub-page is analyzed to determine if the selected image has been previously reduced. If so, control jumps to step S670. Otherwise, control continues to step S640.

In step S640, the selected image is copied to a new sub-page. Next, in step S650, a link to the new sub-page is generated. Then, in step S660, the full-size image is removed from the current page or sub-page, and the reduced image and the generated link are added to the current page to form the re-authored page. Control then jumps to step S680.

In contrast, in step S670, rather than moving the full-sized image from the current sub-page, the old previously reduced image is removed from the current sub-page and the new reduced image is added to the current sub-page. However, because the current sub-page should already have a link to the previously-created sub-page containing the full-size image, it is not necessary to again add the link to the current sub-page or to create a new sub-page storing that full-sized image. Control then continues to step S680, where the control routine ends.

Even with perfect automatic re-authoring of documents, there is often simply too much information in a typical web document to make serendipitous cellular phone web browsing a pleasurable or profitable past-time, due to the very small, text-only-type display used in cellular phones. Typically, these devices and services will be used to find and present information that the user is specifically looking for. That is, these devices and services will be used for targeted information search and extraction. The document filtering systems and methods of this invention allow users to extract only portions of documents that they are interested in, via a simple, end-user scripting language that combines structural page navigation commands with regular expression pattern matching and report generation functions.

The SPHINX system, as described in R. Miller et al., "SPHINX: a framework for creating personal, site-specific Web crawlers", Seventh International World-Wide Web Conference, Brisbane, Australia, April 1998, provides a visual tool that lets users create custom "personal" web crawlers that are similar in functionality to the filtering mechanism of the systems and methods of this invention. The Internet Scrapbook, as described in A. Sugiura et al., "Internet Scrapbook: automating Web browsing tasks by programming-by-demonstration", Seventh International World-Wide Web Conference, Brisbane, Australia, April 1998, allow users to visually select elements from web pages and then updates these elements in a "scrapbook" when the web pages change, providing a function that is similar to the page element retrieval for a particular page of the systems and methods of this invention. Several commercial products also provide similar functionality for other applications, such as, for example, corporate reporting or database population. Lanacom's Headliner Pro, as described in Lanacom, Inc., http://www.headliner.com, and OnDisplay's CenterStage, as described in OnDisplay, Inc., http://www.ondisplay.com, both provide visual editors that let users specify which structural parts of web pages to extract. However, neither of these systems provide users with any ability to extract content based on regular expressions or keywords.

The document filtering systems and methods of this invention have the capability to extract partial information from a document based on commands written by a user in a high-level scripting language. The document filtering systems and methods of this invention combine page structure navigation, regular expression matching, site traversal, i.e., web crawling, and iterative matching, in addition to re-authoring of the extracted information using the document re-authoring systems and methods of this invention described above.

A filter script is simply entered into a text file and saved on a web server. The filter script is executed whenever a user requests its Uniform Resource Locator. A filter script will typically load a target web page, traverse to particular locations within that web page, which are described structurally and/or by regular expressions, extract the content found at those locations, and then send the extracted content through the document re-authoring system to be properly formatted before being returned to the user.

The document filtering systems and methods of this invention take advantage of the parse tree creation and navigation of the document re-authoring systems and methods of this invention, by providing a simple set of HTML document navigation options that use the concept of a "current context" in the HTML document. The current context is analogous to a "cursor" in database programming, in that it refers to a location within HTML the document.

In actuality, the current context refers to a node in the HTML parse tree. The navigation commands serve to move this reference around within the tree until a desired part of the HTML document is found, at which time the desired part can be extracted. For example, FIG. 10 shows an HTML document and its corresponding parse tree. When the document is first loaded, by executing a "GO URL" command, the current context is pointing at the root node of the parse tree, which essentially refers to the entire document.

Figure 15:
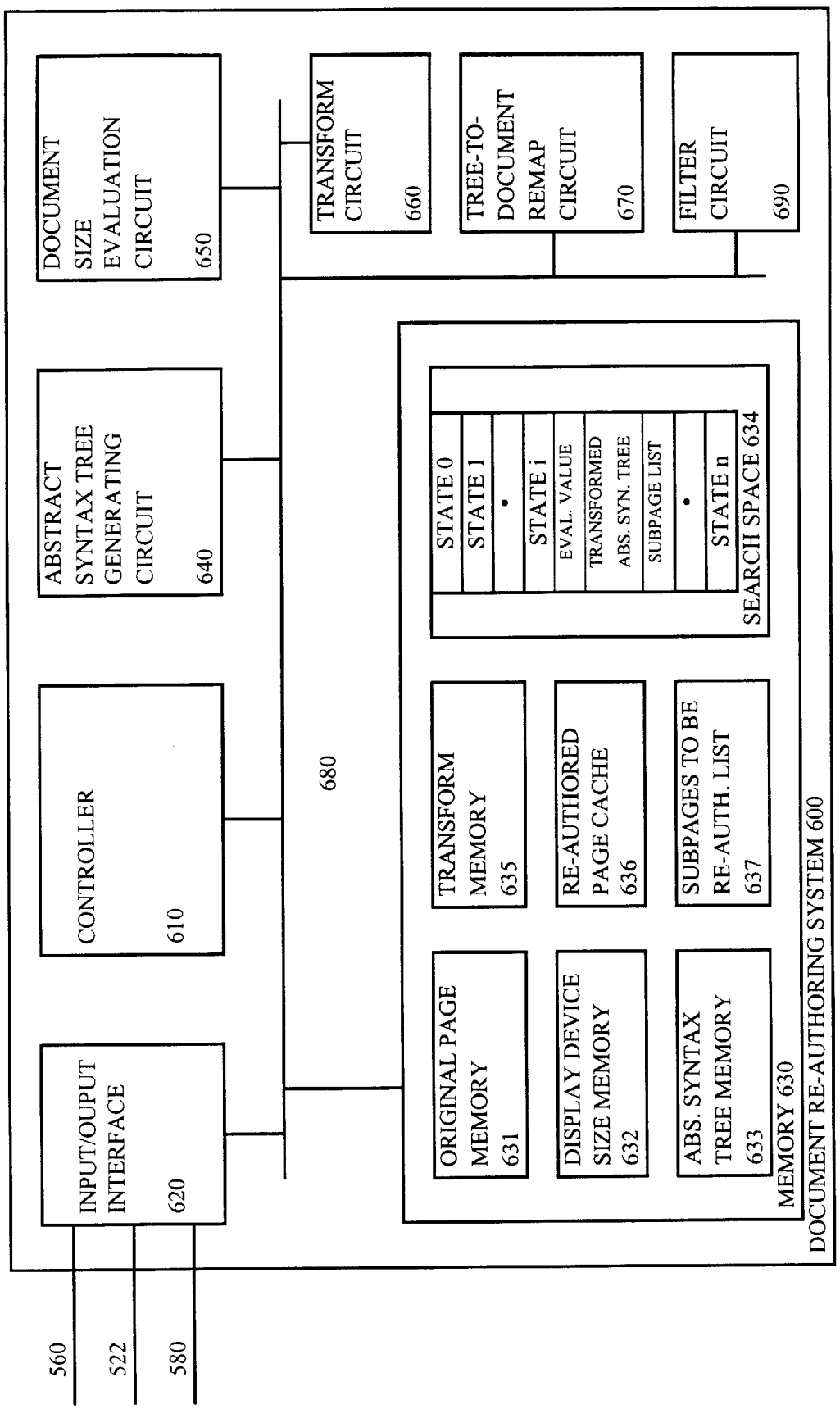
FIG. 15 is a functional block diagram outlining one exemplary embodiment of a document re-authoring system 600 of this invention including the document filtering according to this invention.

FIG. 15 shows one exemplary embodiment of the document re-authoring system 600 further including a filter circuit 690 that implements the document filtering systems and methods outlined herein. In particular, the filter circuit 690, under control of the controller 610, inputs a requested filter, requested by the user over one of the communication links 522 or 560, that is supplied from a node of the distributed network storing such a filter over the communication link 580. The filter circuit 690 then inputs the requested document from the node of the distributed network storing the requested document and filters the requested document to extract the requested page elements. The filter circuit 690 stores these extracted page elements in the original page memory 631 in place of the original document initially stored there. The document re-authoring system 600 then operates on these extracted page elements as if they were the original document to be re-authored.

In extracting the page elements from the original document, the filter circuit 690 uses the abstract syntax tree generated by the abstract syntax tree generating circuit from the original document and stored in the abstract syntax tree memory 633.

Figure 16:
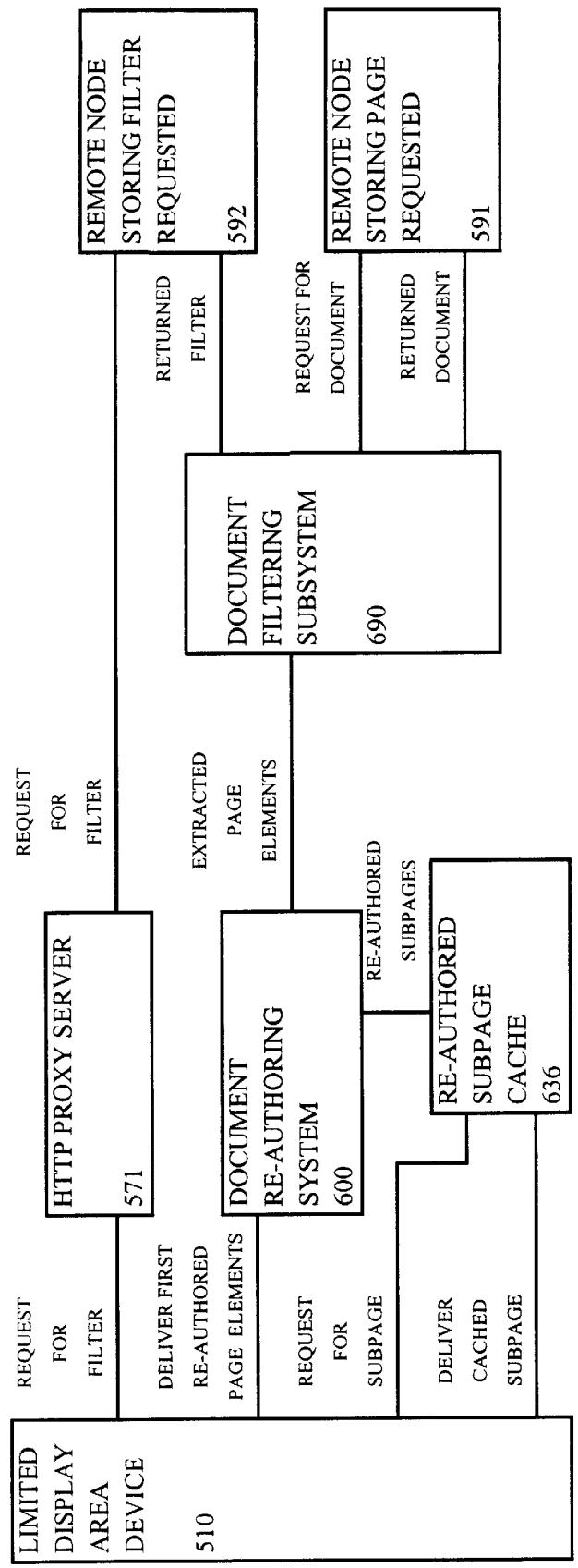
FIG. 16 is one exemplary embodiment of the document flow during document filtering and re-authoring according to this invention.

FIG. 16 outlines one exemplary embodiment of the information flow when the requested document is also to be filtered. As shown in FIG. 16, after a request for filter is output by the limited display area device 510 to the HTTP proxy server 571, the request for filter is forwarded by the HTTP proxy server 571 to a remote node 592 of the new distributed network that stores the requested filter. The remote node 592 storing the requested filter returns the requested filter to the document filter 690. The document filter 690 then requests, under control of the controller 610, the document from the remote node 591 of the distributed network that stores the request page. The remote node 591 storing the requested page returns the document to the document filter 690. The document filter 690 then filters the returned document using the filter returned from the remote node 592 and the abstract syntax tree generated by the abstract syntax tree generating circuit 640. The document filter 690 returns the extracted page elements to the document re-authoring system 600 where the extracted page elements are treated as an original document for re-authoring as described above.

There are three types of page navigation commands, those which go into the current context to select more specific content, those which go out from the current context to enclosing structures, and those which traverse the page sequentially from the start of the current context, for example, to navigate to the next structure of some kind, which may or may not be properly contained within the current context.

Figure 17:
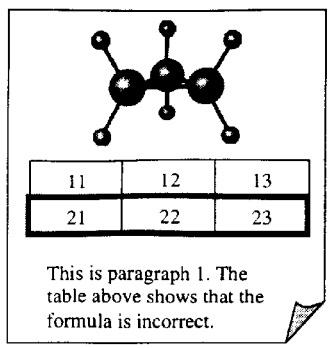
FIG. 17 shows an exemplary embodiment of using the document filtering systems and methods of this invention to navigate within the abstract syntax tree generated from the image shown in FIG. 10.
Figure 17:
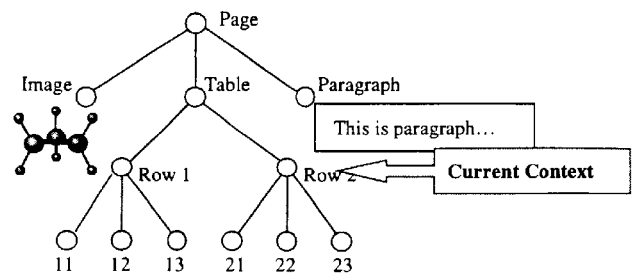

The simplest type of navigation command goes into the current context. For example, given the document and current context shown in FIG. 10, executing the command "GO ROW 2" results in the current context being moved to the second table row object within the current context, as shown in FIG. 17.

Figure 18:
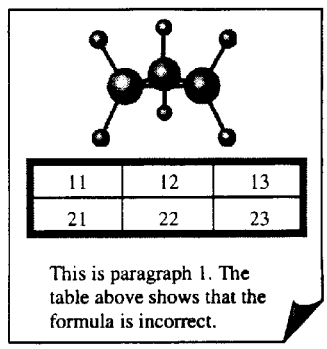
FIG. 18 illustrates further navigation within the abstract syntax tree of FIG. 10 according to the document filtering systems and methods of this invention.
Figure 18:
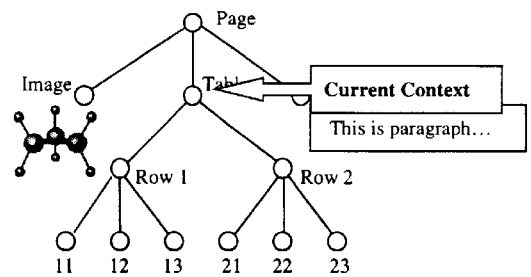

The current context can also be enlarged, i.e., moved up the parse tree towards the root node, by using a "GO ENCLOSING" command. For example, given the document and context shown in FIG. 17, a "GO ENCLOSING TABLE" command results in the current context shown in FIG. 18.

Finally, the current context can be moved forwards or backwards among the objects in a page in a sequential manner, as they appear to a user. This is accomplished by moving the current context forwards or backwards from its current location within a prefix traversal of the parse tree. This results in a search that first is performed within the current context, then continues with the objects that follow the current context on the page. For example, a "GO PREVIOUS IMAGE" command moves to the previous image found sequentially from the current context.

In addition to named page elements, navigation commands can also be specified using regular expressions. For example, a "GO NEXT" "DOW\sJONES\s*(\d+)\s*POINTS"" command moves the current context to the next match of the specified regular expression, using a prefix traversal of text blocks on the page. The filtering systems and methods of this invention are able to demarcate sub-expressions and recall them into output strings.

The simple navigation commands described above can also be used to navigate among a set of linked web pages through the use of the "LINKEDPAGE" page object type. For example, a "GO FIRST LINKEDPAGE" command moves to the first hypertext link within the current context, loads the referenced page and moves the current context to the root of that document's parse tree, while a "GO ENCLOSING LINKEDPAGE" command returns the current context to the hypertext link that led to the document currently being processed.

Traversal between pages is handled by a stack of script activations, each of which pairs script state information (including current context) with a particular Uniform Resource Locator and a parse tree. This facilitates rapid navigation back and forth among linked pages and is required to support the "GO ENCLOSING LINKEDPAGE" command.

Once the current context has been moved to a page object that is of interest, a "REPORT" command is used to extract it. The "REPORT" command can be issued several times within a filter script, in which case the extracted page elements are concatenated. The "REPORT" command can also be used to insert arbitrary strings into the output, which can contain sub-strings from regular expression pattern matching. For example, the "REPORT "Dow:\1"" command adds the string "Dow:" plus a substring identified by the identifier "1" extracted during a regular expression match to the filter's output.

Often the user does not know in advance how many page elements of a particular kind will exist on a web page. For example, the number of news article paragraphs in a daily e-zine will generally not be known in advance. The "FOREACH" command addresses this lack of information by executing a sequence of commands for every page element found within the current context that meets a specified criteria. When used with a "LINKEDPAGE" target, this provides the functionality of a web spider that can visit all of the linked pages within a web site. In the following examples the ellipses represent sequences of valid filter commands:

A "FOREACH PARAGRAPH" command moves to each paragraph within the current context in turn DO . . . END and executes the specified commands.

A "FOREACH LINKEDPAGE" command loads each page that is reachable through hypertext links from the DO . . . END current page in turn and executes the specified commands.

Whenever a filter encounters any kind of error, including navigation failures, regular expression matching failures, or web page retrieval error, it simply begins the next iteration of the innermost "FOREACH" loop in which the offending command is embedded. If the error occurred at the top level of a filter, the filter halts execution and produces any pending output.

The document re-authoring systems and methods of this invention do a good job of automatically re-authoring documents for display on devices with small screens. One exemplary embodiment of the document re-authoring systems and methods of this invention have been informally tested on a wide range of pages for a number of screen sizes. This exemplary embodiment of the document re-authoring systems and methods of this invention produced output that is legible and navigable.

In one exemplary embodiment, the document re-authoring systems and methods of this invention simply add up the space requirements of all images and text to arrive at an estimate of the screen area requirements for a document. This is adequate for fairly dense documents with minimal structure, such as those in a Xerox Annual Report, but works poorly for documents with a lot of whitespace or which use advanced layout techniques, such as, for example, tables. In a second exemplary embodiment, the document re-authoring systems and methods of this invention includes a size estimator that performs much of the work performed by a browser in formatting each document version onto a display area. Factors other than required screen area may also need to be included, such as actual width requirements of the re-authored document, because users don't like to scroll horizontally, bandwidth requirements, and aesthetic measures.

Users should be able to adjust the various heuristics used in the document re-authoring systems and methods of this invention to suit their taste. For example, the user could specify the relative preference of the transformation techniques, or specify that some transforms not be used at all. At a higher level of abstraction, the user could express their preferences for a set of trade-offs, such as 'more content' vs. 'larger representation'. In addition, the re-authoring systems and methods of this invention could be moved to the client and coupled with the browser so that the user could dynamically apply and undo different transformations until the user achieves a result the user likes.

The automatic document re-authoring systems and methods of this invention, and in particular, the exemplary embodiment of the HTTP proxy server described above, are preferably implemented on a programmed general purpose computer. However, the automatic document re-authoring systems and methods of this invention, and in particular, the HTTP proxy server described above, can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine, can be used to implement the automatic document re-authoring system and method of this invention, and in particular, the HTTP proxy server described above.

The automatic document re-authoring systems and methods according to this invention can be performed by invoking a stand-alone re-authoring program running on the HTTP proxy server described above, or can be performed through a plug-in to a conventional web browser, such as Netscape Navigator or the like.

Furthermore, while the automatic document re-authoring systems and methods of this invention have been described in relation to re-authoring documents obtained from the world-wide web, the automatic re-authoring systems and methods of this invention can be used to re-author documents obtained from any distributed network, such as a local area network, a wide area network, an intranet, the Internet, or any other distributed processing and storage network.

While this invention has been described in conjunction with the specific embodiments outlined above, it is evident that many alternatives, modifications and variations will be apparent to those skilled in the art. Accordingly, the preferred embodiments of the invention set forth above are intended to be illustrative, not limiting. Various changes may be made without departing from the spirit and scope of the invention.

What is claimed is:

1. A method for automatically re-authoring a document, comprising:

parsing the document;

transforming the parsed document, using one of a plurality of transforms, into a transformed document;

generating an evaluation value from the transformed document;

determining if the evaluation value meets at least one evaluation criterion;

if the evaluation value for the transformed document does not meet the at least one criterion, repeating the transforming, generating and determining steps using a different one of the plurality of transforms; and if the evaluation value for the transformed document meets the at least one criterion, outputting the transformed document.

2. The method of claim 1, wherein outputting the transformed document comprises transmitting the transformed document to a display device.

3. The method of claim 2, wherein the display device has a display area that is less than the display area of a desktop monitor.

4. The method of claim 1, wherein parsing the document comprises generating an abstract syntax tree from the document.

5. The method of claim 4, wherein transforming the parsed document comprises transforming the abstract syntax tree into at least one transformed abstract syntax tree.

6. The method of claim 1, wherein transforming the parsed document comprises:

selecting a transform from the plurality of transforms;

determining if the selected transform can properly be applied to the parsed document;

if the selected transform can properly be applied, transforming the parsed document into the transformed document using the selected transform; and if the selected transform cannot properly be applied, repeating the selecting and determining steps for a different one of the plurality of transforms.

7. The method of claim 6, wherein determining if the selected transform can properly be applied to the parsed document comprises determining if the selected transform is inconsistent with a previously-applied transform.

8. The method of claim 6, wherein determining if the selected transform can properly be applied to the parsed document comprises determining if the parsed document meets application criteria for the selected transform.

9. The method of claim 6, wherein transforming the parsed document into the transformed document using the selected transform comprises at least one of outlining sections of the document, removing content from the document, reducing a size of at least one image within the document and summarizing text within the document.

10. The method of claim 1, wherein, if no transform results in a transformed document that has an evaluation value that meets the at least one evaluation criterion, the method further comprises:

selecting the transformed document having the evaluation value that most closely meets the evaluation value; and repeating the transforming, generating and determining steps on the selected transformed document using an additional transform.

11. The method of claim 1, wherein transforming the document into the transformed document comprises at least one of outlining sections of the document, removing contentless portions from the document; removing content from the document, reducing a size of at least one image within the document and summarizing text within the document.

12. The method of claim 11, wherein outlining sections of the document comprises:

identifying sections within the document identifying a section header and a document portion for each section;

placing each identified document portion into a separate subpage;

removing the identified document portions from the parsed document to form a transformed document containing only the identified sections headers;

converting each of the identified section headers into a link to the corresponding subpage; and linking the separate subpages together and to the transformed document.

13. The method of claim 12, wherein identifying the sections comprises identifying text blocks within the document.

14. The method of claim 13, wherein identifying the section header and document portion within the text block comprises selecting a representative text string of the text block as the section header and the text block as the document portion.

15. The method of claim 14, wherein the text string is at least a portion of a first sentence of the text block.

16. The method of claim 14, wherein the text string is section header of the text block.

17. The method of claim 11, wherein removing contentless portions from the document comprises replacing sequences of page breaks or paragraph breaks with a single page break or paragraph break.

18. The method of claim 11, wherein removing contentless portions from the document comprises removing formatting from the document.

19. The method of claim 18, wherein removing formatting from the document comprises at least one of removing indenting from the document; converting text strings of the document to at least one of a single font and font size, removing bullets from the document, removing background space from the document and removing banner images from the document.

20. The method of claim 19, wherein removing banner images from the document further comprises replacing the banner images with corresponding text links.

21. The method of claim 11, wherein reducing a size of at least one image within the document comprises:

identifying at least one image within the document placing each identified image into a separate subpage;

generating a reduced version of each identified image;

removing each identified image from the document and inserting the reduced version of each removed image to form the transformed document; and adding, for each removed image, a link into the reduced version of that image to the subpage containing that removed image.

22. The method of claim 1 wherein removing content from the document comprises at least one of removing at least one image from the document and removing at least one table cell from the document.

23. The method of claim 22, wherein removing at least one image from the document comprises one of removing all images from the document, removing all but the first image from the document, and removing all but the first and last images from the document.

24. The method of claim 23, wherein removing all images from the document comprises:

identifying each image in the document;

adding each identified image to a separate subpage; and replacing each identified image with a link to the corresponding subpage to form the transformed document.

25. The method of claim 24, further comprising linking the separate subpages for each identified image together.

26. The method of claim 24, wherein each link includes one of a text string associated with that identified image and a predetermined icon representing an image.

27. The method of claim 26, wherein the text string associated with that identified image is obtained from hypertext information associated with that identified image.

28. The method of claim 23, wherein removing all images from the document comprises:

identifying each image in the document;

adding each identified image to a separate subpage;

replacing the first identified image with a link to the corresponding subpage to form the transformed document;

removing any other identified images from the transformed page; and linking the separate subpages together.

29. The method of claim 28, wherein the link includes one of a text string associated with that identified image and a predetermined icon representing an image.

30. The method of claim 9, wherein the text string associated with that identified image is obtained from hypertext information associated with that identified image.

31. The method of claim 23, wherein removing all but the first image from the document comprises:

identifying each image in the document except the first image;

adding each identified image to a separate subpage; and replacing each identified image with a link to the corresponding subpage to form the transformed document.

32. The method of claim 31, further comprising linking the separate subpages for each identified image together.

33. The method of claim 31, wherein each link includes one of a text string associated with that identified image and a predetermined icon representing an image.

34. The method of claim 33, wherein the text string associated with that identified image is obtained from hypertext information associated with that identified image.

35. The method of claim 23, wherein removing all but the first image from the document comprises:

identifying each image in the document except the first image;

adding each identified image to a separate subpage;

adding a link to one of the separate subpages to the first image to form the transformed document;

removing the identified images from the transformed page; and linking the separate subpages together.

36. The method of claim 23, wherein removing all but the first and last images from the document comprises:

identifying each image in the document except the first image and the last image;

adding each identified image to a separate subpage; and replacing each identified image with a link to the corresponding subpage to form the transformed document.

37. The method of claim 36, further comprising linking the separate subpages for each identified image together.

38. The method of claim 36, wherein each link includes one of a text string associated with that identified image and a predetermined icon representing an image.

39. The method of claim 38, wherein the text string associated with that identified image is obtained from hypertext information associated with that identified image.

40. The method of claim 23, wherein removing all but the first and last images from the document comprises:

identifying each image in the document except the first image and the last image;

adding each identified image to a separate subpage;

adding a first link to one of the separate subpages to the first image and a second link to one of the separate subpages to the last image to form the transformed document;

removing the identified images from the transformed page; and linking the separate subpages together.

41. The method of claim 22, wherein removing at least one table cell from the document comprises:

determining if the table contains any sidebars of links;

if the table contains any sidebars, converting the sidebars into a list of links as a last cell of the table;

identifying all but the first cell of the table;

adding each identified cell to a separate subpage;

replacing the table with the first cell to form the transformed document; and linking the separate subpages together and to the transformed document.

42. The method of claim 41, wherein, for each cell, adding that cell into a separate subpage comprises:

determining if that cell is a nested table;

if that cell is not a nested table, adding that cell to the separate subpage; and if that cell is a nested table, repeating the determining, converting, identifying, adding, replacing and linking steps of claim 41.

43. The method of claim 22, wherein removing at least one table cell from the document comprises:

determining if the table contains any sidebars of links;

if the table contains any sidebars, converting the sidebars into a list of links as a last cell of the table;

identifying each cell of the table;

adding each identified cell to a separate subpage;

replacing the table with a link to one of the separate subpages to form the transformed document; and linking the separate subpages together.

44. The method of claim 43, wherein, for each cell, adding that cell into a separate subpage comprises:

determining if that cell is a nested table;

if that cell is not a nested table, adding that cell to the separate subpage; and if that cell is a nested table, repeating the determining, converting, identifying, adding, replacing and linking steps of claim 41.

45. The method of claim 1, wherein transforming the parsed document into a transformed document further comprises generating at least one subpage.

46. The method of claim 45, when a transformed document meets the at least one evaluation criterion, further comprising:

generating an evaluation value for each generated subpage for that transformed document;

determining, for each subpage, if the evaluation value for that subpage meets the at least one evaluation criterion;

for each subpage, if the evaluation value for that subpage does not meet the at least one criterion, performing the transforming, generating and determining steps on that subpage using an additional one of the transforms to generate a transformed subpage; and for each subpage, if that subpage meets the at least one criterion, identifying that subpage as ready to be output.

47. The method of claim 46, wherein identifying that subpage as ready to be output comprises storing that subpage in an output cache.

48. The method of claim 45, when a transformed subpage meets the at least one evaluation criterion, further comprising:

generating an evaluation value for each generated subpage for that transformed subpage;

determining, for each subpage, if the evaluation value for that subpage meets the at least one evaluation criterion;

for each subpage, if the evaluation value for that subpage does not meet the at least one criterion, performing the transforming, generating and determining steps on that subpage using an additional one of the transforms to generate a transformed subpage; and for each subpage, if that subpage meets the at least one criterion, identifying that subpage as ready to be output.

49. The method of claim 1, further comprising, after parsing the document:

generating an evaluation value from the document;

determining if the evaluation value meets at least one evaluation criterion;

if the document does not meet the at least one criterion, performing the transforming, generating and determining steps using a first one of the transforms; and if the document meets the at least one criterion, outputting the document without transforming the document.

50. The method of claim 1, wherein transforming the document comprises:

filtering the document to extract desired portions of the document; and replacing the document with the extracted portions.

51. A document re-authoring system that automatically re-authors a document, comprising a parse tree generating circuit;

a document size evaluation circuit; and a transform circuit.

52. The document re-authoring system of claim 51, wherein the parse tree generating circuit parses the document to generate a parse tree.

53. The document re-authoring system of claim 52, wherein the parse tree is an abstract syntax tree.

54. The document re-authoring system of claim 52, wherein the document size evaluation circuit evaluates the parse tree generated by the parse tree generating circuit to determine if the document meets at least one evaluation criterion.

55. The document re-authoring system of claim 54, wherein, when the document meets the at least one evaluation criterion; the document is output to a display device that has a display area less than a display area of a desktop monitor.

56. The document re-authoring system of claim 54, wherein, when the document does not meet the at least one evaluation criterion; the transform circuit transforms the parse tree using a first transform to generate a first transformed parse tree.

57. The document re-authoring system of claim 56, wherein the document size evaluation circuit evaluates the transformed parse tree generated by the transform circuit to determine if a transformed document corresponding to the transformed parse tree meets at least one evaluation criterion.

58. The document re-authoring system of claim 57, wherein, when the transformed document does not meet the at least one evaluation criterion; the transform circuit transforms the parse tree using a second transform to generate a second transformed parse tree.

59. The document re-authoring system of claim 57, wherein, when the transformed document meets the at least one evaluation criterion; the transformed document is output to a display device that has a display area less than a display area of a desktop monitor.

60. The document re-authoring system of claim 56, wherein, in response to transforming the parse tree, the transform circuit also generates at least subpage parse tree corresponding to at least one subpage.

61. The document re-authoring system of claim 60, wherein, when the transformed document meets the at least one evaluation criterion; the document size evaluation circuit evaluates each resulting subpage parse tree generated by the transform circuit from that transformed document to determine if the subpage corresponding to that subpage parse tree meets at least one evaluation criterion.

62. The document re-authoring system of claim 61, wherein, for each resulting subpage parse tree, when the subpage corresponding to that subpage parse tree meets the at least one evaluation criterion; that subpage is identified as ready to be output to the display device.

63. The document re-authoring system of claim 61, wherein, for each resulting subpage parse tree, when the subpage corresponding to that subpage parse tree does not meet the at least one evaluation criterion; the transform circuit transforms that subpage parse tree using a second transform to generate a transformed subpage parse tree.

* * * * *